United States Patent
Hakii

(10) Patent No.: US 8,384,982 B2
(45) Date of Patent: Feb. 26, 2013

(54) DISPLAY ELEMENT

(75) Inventor: Takeshi Hakii, Sagamihara (JP)

(73) Assignee: Konica Minolta Holdings, Inc., Tokyo (JP)

( * ) Notice: Subject to any disclaimer, the term of this patent is extended or adjusted under 35 U.S.C. 154(b) by 291 days.

(21) Appl. No.: 12/733,603

(22) PCT Filed: Sep. 3, 2008

(86) PCT No.: PCT/JP2008/065855
§ 371 (c)(1),
(2), (4) Date: Mar. 10, 2010

(87) PCT Pub. No.: WO2009/037971
PCT Pub. Date: Mar. 26, 2009

(65) Prior Publication Data
US 2010/0213813 A1    Aug. 26, 2010

(30) Foreign Application Priority Data
Sep. 18, 2007   (JP) ................... 2007-240698

(51) Int. Cl.
*G02B 26/00* (2006.01)
*G09G 3/38* (2006.01)

(52) U.S. Cl. .................. 359/265; 345/105

(58) Field of Classification Search ......... 359/265–275; 345/105, 107; 252/582, 583, 586
See application file for complete search history.

(56) References Cited

U.S. PATENT DOCUMENTS

| 7,619,803 B2 * | 11/2009 | Kokeguchi et al. ........... 359/265 |
| 7,773,285 B2 * | 8/2010 | Kokeguchi ................... 359/270 |
| 2005/0248825 A1 * | 11/2005 | Warren et al. ............... 359/265 |

FOREIGN PATENT DOCUMENTS

| EP | 1 887 416 A1 | 2/2008 |
| JP | 07-270831 A | 10/1995 |
| JP | 2003-270670 A | 9/2003 |
| WO | WO 2006/061980 A1 | 6/2006 |
| WO | WO 2006129424 | * 7/2006 |
| WO | WO 2007058063 | * 5/2007 |

(Continued)

*Primary Examiner* — Tuyen Tra
(74) *Attorney, Agent, or Firm* — Holtz, Holtz, Goodman & Chick, PC

(57) ABSTRACT

A display element containing an electrolyte (containing a metal salt compound) disposed between counter electrodes, wherein a compound represented by the following Formula (A) is immobilized on at least one of the counter electrodes:

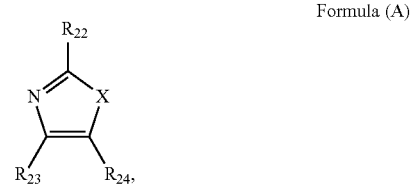

Formula (A)

wherein $R_{22}$ represents an aryl group, $R_{23}$ and $R_{24}$ independently represents a hydrogen atom or a substituent; X represents >N—$R_{25}$, an oxygen atom or sulfur atom; and $R_{25}$ represents a hydrogen atom or a substituent, a ratio of a region on which the compound of Formula (A) is immobilized to a region on which the compound is not immobilized is 1:4 to 4:1. A black display, a white display and a color display having a color other than black are achieved by the operation of the counter electrodes.

9 Claims, 1 Drawing Sheet

FOREIGN PATENT DOCUMENTS

| WO | WO 2008/075565 A1 | 6/2008 |
| WO | WO 2008/087790 A1 | 7/2008 |
| WO | WO 2008/111321 A1 | 9/2008 |

\* cited by examiner

DISPLAY ELEMENT

This application is the United States national phase application of International Application PCT/JP2008/065855 filed Sep. 3, 2008.

TECHNICAL FIELD

The present invention relates to a new electrochromic display element.

BACKGROUND

In recent years, along with enhancement of the operation rate of personal computers, and popularization of network infrastructure, as well as an increase in capacity of data storage and a decrease in its cost, occasions have increasingly occurred in which information such as documents and images, which have been provided in the form of paper printed matter, are received as simpler electronic information and viewed as received electronic information.

As viewing means for such electronic information, mainly employed are those of light emitting types such as conventional liquid crystal displays and CRTs or recent organic electroluminescence displays. Specifically, when electronic information includes document information, it is required to watch any of the above viewing means for a relatively long time. However, it is hardly stated that the above viewing means are human friendly. It is common knowledge that light emitting type displays result in problems such as eye fatigue due to flicker, inconvenient portability, limitations in reading posture, necessity to look at still images, or an increase in power consumption.

As means to overcome the above drawbacks, are known reflection type displays (having memory function) which utilize outside light and consume no power to maintain images. However, it is difficult to state that due to the following reasons, they exhibit sufficient performance.

Namely, a system employing polarizing plates, such as a reflection type liquid crystal, results in a problem for a white display due to a low reflectance of approximately 40%. In addition, it is difficulty to state that most methods to produce structuring members are simple and easy. Further, polymer dispersion type liquid crystals require high voltage and the contrast of the resulting images is insufficient due to utilizing the difference in refractive indices between organic compounds. Still further, polymer network type liquid crystals result in problems such as application of high voltage and requirement of complicated TFT circuitry to enhance memory capability. Yet further, display elements employing electrophoresis require high voltage of at least 10 V and tend to suffer insufficient durability due to aggregation of electrophoretic particles. Tin their principle, a bright white hue cannot be obtained due to coloring of filter by the former, and a dark black color cannot been obtained due to pattern color.

As one of the methods which enable a full color display, an electrochromic method has been know, which can be driven with a voltage of 3V or less. When a display exhibiting a bright white color, a high white-black contrast and a color display is prepared using an electrochromic method, it is necessary to laminate three layers each exhibiting a different color, resulting in a high cost due to the complicated element constitution. A full color electrochromic display having a flat color mixing structure has been known (for example, refer to Patent document 1). In this method, no fully sufficient white-black contrast has been obtained, since a dark black color cannot been obtained due to the flat color mixing structure.

Also, a method to use a poly pyridine compound in an electrochromic display has been known (for example, refer to Patent document 2), however, in this method, only two colors can be displayed and, specifically, a black display cannot be obtained.

Patent Document 1: JP-A No. 2003-270670
Patent Document 2: Japanese patent No. 2930860

SUMMARY OF THE INVENTION

Problem to be Solved by the Invention

In view of the foregoing, the present invention was achieved. An object of the present invention is to provide a display element, which is composed of a simple member structure, exhibits black and white display as well as full color display with bright white hue and high display contrast.

Means for Solving the Problems

The above problems of the present invention were dissolved employing the following embodiments.

1. A display element characterized by that,
    the display element comprises an electrolyte between counter electrodes,
    a compound represented by Formula (A) is immobilized on at least one of the counter electrodes,
    a ratio of a region on which the compound represented by Formula (A) is immobilized to a region on which the compound is not immobilized is 1:4 to 4:1,
    the electrolyte comprises a metal salt compound, and
    a black display, a white display and a color display having a color other than black are achieved by operating the counter electrodes.

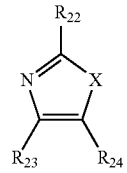

Formula (A)

In Formula (A), $R_{22}$ represents a substituted or unsubstituted aryl group; $R_{23}$ and $R_{24}$ independently represents a hydrogen atom or a substituent; X represents $>N-R_{25}$, an oxygen atom or sulfur atom; and $R_{25}$ represents a hydrogen atom or a substituent.

2. The display element as described in above item 1, wherein the electrode on which the compound represented by Formula (A) is immobilized is nano-porous electrode.
3. The display element as described in above item 1 or 2, wherein the compound represented by Formula (A) has an absorbing group which absorbs chemically or physically to an electrode surface.
4. The display element as described in above item 3, wherein the absorbing group is —COOH, —P=O(OH)$_2$, —OP=O(OH)$_2$ or —Si(OR)$_3$, wherein R is an alkyl group.
5. The display element as described in one of above items 1 to 4, a region in which the compound represented by Formula (A) is immobilized and a region in which the compound represented by Formula (A) is not immobilized are formed by coating separately via an inkjet method.
6. The display element as described in one of above items 1 to 5, wherein a layer in which the compound represented by Formula (A) is immobilized and a layer in which the compound represented by Formula (A) is not immobilized are superposed.
7. The display element as described in one of above items 1 to 6, wherein the metal salt compound is a silver salt compound.
8. The display element, described in one of above items 1 to 7, wherein the electrolyte contains at least one of the compounds represented by following Formula (1) or (2).

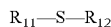

Formula (1)

in the formula, each of $R_{11}$ and $R_{12}$ represents a substituted or unsubstituted hydrocarbon group. When a ring containing an S atom is formed, an aromatic group is not to be included.

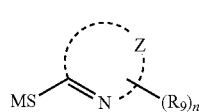

Formula (2)

in the formula, M represents a hydrogen atom, a metal atom, or quaternary ammonium; Z represents a nitrogen-containing heterocyclic ring; n represents an integer of 0 to 5; $R_9$ represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group, or a heterocyclic group. When n is at least 2, each $R_9$ may be the same or different and may be joined to form a condensed ring.
9. The display element, described in one of above items 1 to 8, wherein the electrolyte contains at least one of the compounds represented by following Formula (3) or (4).

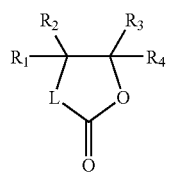

Formula (3)

In the formula, L represents an oxygen atom or $CH_2$, and each of $R_1$-$R_4$ represents a hydrogen atom, an alkyl group, an alkenyl group, an aryl group; a cycloalkyl group, an alkoxyalkyl group, or an alkoxy group.

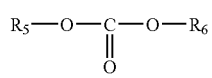

Formula (4)

In the formula, each of $R_5$ and $R_6$ represents a hydrogen atom, an alkyl group, an alkenyl group, an aryl group, a cycloalkyl group, an alkoxyalkyl group, or an alkoxy group.

ADVANTAGE OF THE INVENTION

According to the present invention, it is possible to provide an electrochromic display element which can achieve a bright white display, a high contrast of white/black display and a full-color display in a simple member structure.

DESCRIPTION OF SYMBOLS

Figure 1:
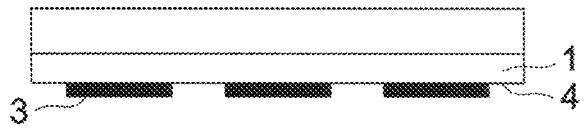
FIG. 1 is a schematic view showing a display element in which the compound represented by Formula (A) of this invention is immobilized on the surface of the counter electrodes in part.
Figure 1:
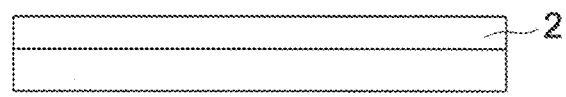

1: Transparent electrode
2: Metal electrode
3: Immobilized region
4: Non-immobilized region
5: Nano-particles electrode in immobilized region
6: Nano-particles electrode in non-immobilized region
7: Nano-particles electrode in immobilized region
8: Nano-particles electrode in non-immobilized region
10: Electrolyte
Optimal Embodiment of The Present Invention Optimal embodiments to achieve the present invention will now are detailed.

In view of the foregoing, the inventors of the present invention conducted diligent investigation and achieved the present invention by discovering that a full color display can be realized with simple parts structure wherein the display element comprises an electrolyte between counter electrodes, a compound represented by Formula (A) is immobilized on at least one of the counter electrodes, a ratio of a region on which the compound represented by Formula (A) is immobilized to a region on which the compound is not immobilized is 1:4 to 4:1, the electrolyte comprises a metal salt compound, and a black display, a white display and a color display having a color other than black are achieved by operating the counter electrodes.

The present invention will now be detailed.
(Basic Structure of Display Element)

In the display part of the display element of this invention is provided with a corresponding pair of counter electrodes. One of the electrodes closed to display parts Electrode 1 is a transparent electrode such as ITO electrode, and another Electrode 2 is a metal electrode such as silver electrode. The compound represented by Formula (A) is immobilized on the Electrode 1 so that a ratio of a region on which the compound represented by Formula (A) is immobilized to a region on which the compound is not immobilized is 1:4 to 4:1. An electrolyte is maintained between the Electrode 1 and Electrode 2, and redox reaction of the compound represented by Formula (A) immobilized on the Electrode 1 is carried out by applying voltage having both negative and positive polarities, so that transparent state and colored state can be switched reversibly. Further, redox reaction of the metal salt compound is carried out on Electrode 1 and Electrode 2 so that a black metal image in reduced state and transparent state in oxidized state can be switched reversibly.

(Electrolyte)

The "electrolyte" as used in the present invention generally refers to a substance which exhibits ionic conduction when the substance is dissolved in a solvent such as water (hereafter, referred to as "an electrolyte in a narrow sense"), however, in the explanation in the present invention, a mixed substance in which a metal or a compound which may be an electrolyte or a non-electrolyte is contained in an electrolyte in a narrow sense is also referred to as the "electrolyte" (hereafter referred to as an electrolyte in a broad sense).

The electrolyte layer formed between the counter electrodes according to this invention is composed, by selecting according to necessity, of organic solvent, ionic liquid, reduction activation substance, supporting electrode, chelating agent, white scattering material, thickening agent or so on.

Each elements composing the electrolyte layer according to this invention is further described below.

(Organic Solvent for Electrolyte)

The organic solvent capable of being applied to the electrolyte relating to the present invention preferably has boiling point within the range of from 120° C. to 300° C., which can be remaining in the electrolyte layer without evaporation after the formation of the electrolyte layer. As examples of the organic solvent, propylene carbonate, ethylene carbonate, ethylmethyl carbonate, diethyl carbonate, dimethyl carbonate, butylene carbonate, γ-butyrolactone, tetramethylurea, sulfolane, dimethylsulfoxide, 1,3-dimethyl-2-imidazolidinone, 2-(N-methyl)-2-pyrrolidinone, hexamethylphosphortriamide, N-methylpropionamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, acetic anhydride, ethyl acetate, ethyl propionate, dimethoxyethane, diethoxyfuran, tetrahydrofuran, ethylene glycol, diethylene glycol, triethylene glycol monobutyl ether, tricresyl phosphate, 2-ethylhexyl phosphate, dioctyl phthalate, and dioctyl sebacate can be cited.

Preferable compounds for the organic solvent according to this invention are those represented by Formula (3) or (4).

Further listed as usable other solvents in the present invention may be the compounds described in J. A. Riddick, W. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electrolytes Handbook", Vol. 1, Academic Press (1972).

(Ionic Liquid)

Ionic liquid may be added to the electrolyte layer relating to the present invention. Ionic liquid relating to the present invention is the salt existing in a liquid state at room temperature and may be selected from a combination of cation such as imidazolium and pyridinium, and anion such as fluorine ion or triflate.

(Solid Electrolyte and Gel Electrolyte)

A solid electrolyte containing substantially no solvent or a high viscosity electrolyte containing a polymer compound and a gel state electrolyte (referred to gel electrolyte, hereafter) may be employed in addition to a liquid electrolyte composed of solvent or ionic liquid as the electrolyte according to this invention.

Compound Represented by Formula (A)

Compounds represented by Formula (A) are described.

In Formula (A), $R_{22}$ represents a substituted or unsubstituted aryl group; $R_{232}$ and $R_{24}$ independently represents a hydrogen atom or a substituent; X represents >N—$R_{25}$, an oxygen atom or sulfur atom; and $R_{25}$ represents a hydrogen atom or a substituent.

In Formula (A), specific examples of a substituent represented by $R_{22}$, $R_{23}$ and $R_{24}$ include: an alkyl group (for example, a methyl group, an ethyl group, a propyl group, an isopropyl group, a tert-butyl, a pentyl group and a hexyl group), a cycloalkyl group (for example, a cyclohexyl group and a cyclopentyl group), an alkenyl group, a cycloalkenyl group, an alkynyl group (for example, a propargyl group), a glycidyl group, an acrylate group, a methacrylate group, an aromatic group (for example, a phenyl group, a naphthyl group and an anthracenyl group), a heterocycle group (for example, a pyridyl group, a thiazolyl group, an oxazolyl group, an imidazolyl group, a furyl group, a pyrrolyl group, a pyrazinyl group, a pyrimidinyl group, a pyridazinyl group, a selenazolyl group, a sulfolanyl group, a piperidinyl group, a pyrazolyl group and a tetrazolyl group), an alkoxy group (for example, a methoxy group, an ethoxy group, a propyloxy group, a pentyloxy group, a cyclopentyloxy group, a hexyloxy group and a cyclohexyloxy group), an aryloxy group (for example, a phenoxy group), an alkoxycarbonyl group (for example, a methyloxycarbonyl group, an ethyloxycarbonyl group and a butyloxycarbonyl group), an aryloxycarbonyl group (for example, a phenyloxycarbonyl group), a sulfonamide group (for example, a methanesulfonamide group, an ethanesulfonamide group, a butanesulfonamide group, a hexane sulfonamide group, a cyclohexane sulfonamide group and a benzenesulfonamide group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, a phenylaminosulfonyl group and 2-pyridylaminosulfonyl group), a urethane group (for example, a methylureido group, an ethylureido group, and a pentylureido group, a cyclohexylureido group, a phenylureido group and 2-pyridylureido group), an acyl group (for example, an acetyl group, a propionyl group, a butanoyl group, and a hexanoyl group, a cyclohexanoyl group, a benzoyl and a pyridinoyl group), a carbamoyl group (for example, an aminocarbonyl group, a methylaminocarbonyl group, a dimethylaminocarbonyl group, a propylaminocarbonyl group, a pentylaminocarbonyl group, a cyclohexylaminocarbonyl group, a phenylaminocarbonyl group and a 2-pyridylaminocarbonyl group), an acylamino group (for example, an acetylamino group, a benzoylamino group and a methylureido group), an amide group (for example, an acetamide group, a propioneamide group, a butaneamide group, a hexaneamide group and a benzamide group), a sulfonyl group (for example, a methylsulfonyl group, an ethylsulfonyl group, a butylsulfonyl group, a cyclohexylsulfonyl group, a phenylsulfonyl group and a 2-pyridyl sulfonyl group), a sulfonamide group (for example, a methylsulfonamide group, an octylsulfonamide group, a phenylsulfonamide group and a naphthylsulfonamide group), an amino group (for example, an amino group, an ethylamino group, a dimethylamino group, a butylamino group, a cyclopentylamino group, an anilino group and 2-pyridylamino group), a halogen atom (for example, a chlorine atom, a bromine atom and an iodine atom), a cyano group, a nitro group, a sulfo group, a carboxyl group, a hydroxyl group, a phosphono group (for example, a phosphonoethyl group, a phosphonopropyl group and a phosphonooxyethyl group) and an oxamoyl group. These groups may further be substituted with these groups.

$R_1$ is a substituted or unsubstituted aryl group and preferably a substituted or unsubstituted phenyl group and further preferably a substituted or unsubstituted 2-hydroxyphenyl group or 4-hydroxyphenyl group.

$R_{23}$ and $R_{24}$ each are preferably an alkyl group, a cycloalkyl group, an aromatic group or a heterocycle group, more preferably, one of $R_{23}$ and $R_{24}$ is a phenyl group and the other is an alkyl group and further more preferably, both of $R_{23}$ and $R_{24}$ are a phenyl group.

X is preferably $>$N—$R_{25}$. $R_{25}$ is preferably a hydrogen atom, an alkyl group, an aromatic group, a heterocycle group or an acyl group and more preferably a hydrogen atom, an alkyl group having 1 to 10 carbon atoms, an aryl group having 5 to 10 carbon atoms or an acyl group.

Examples of practical compounds of electrochromic compounds represented by Formula (A) are shown below. However the present invention is not limited thereto.

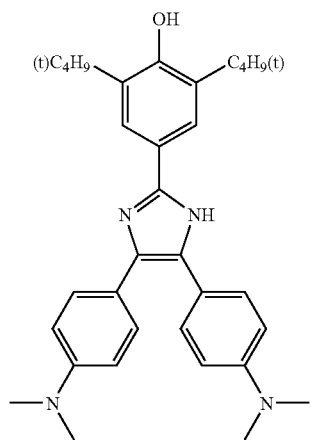

A-1

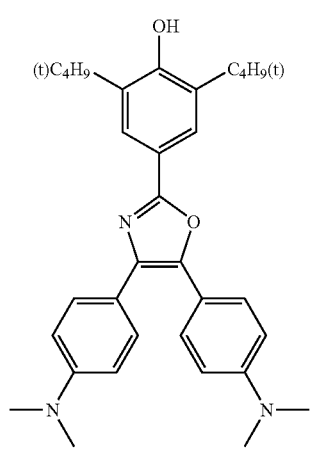

A-2

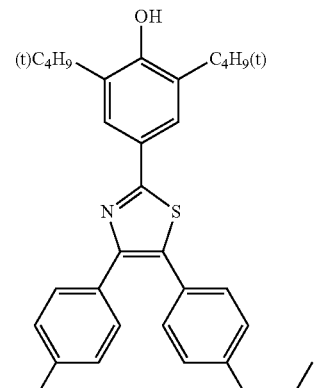

A-3

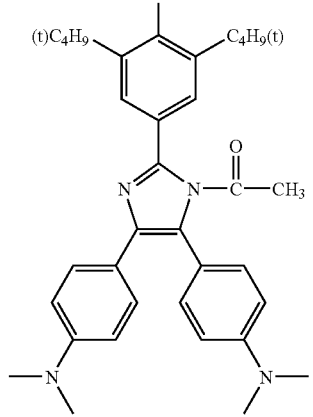

A-4

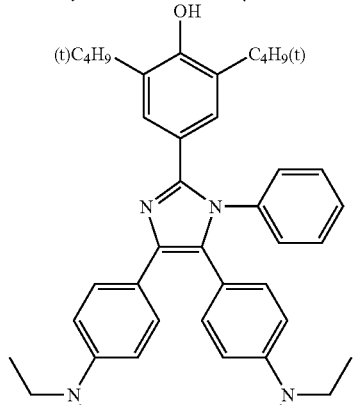

A-5

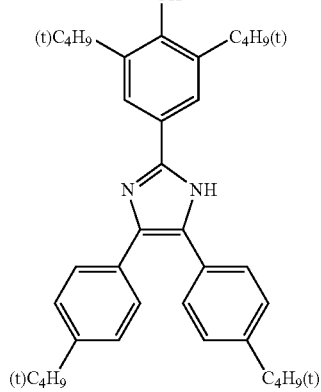

A-6

A-7
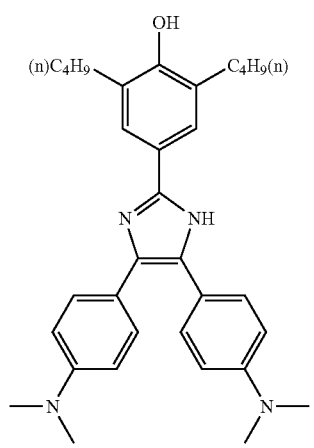
A-10
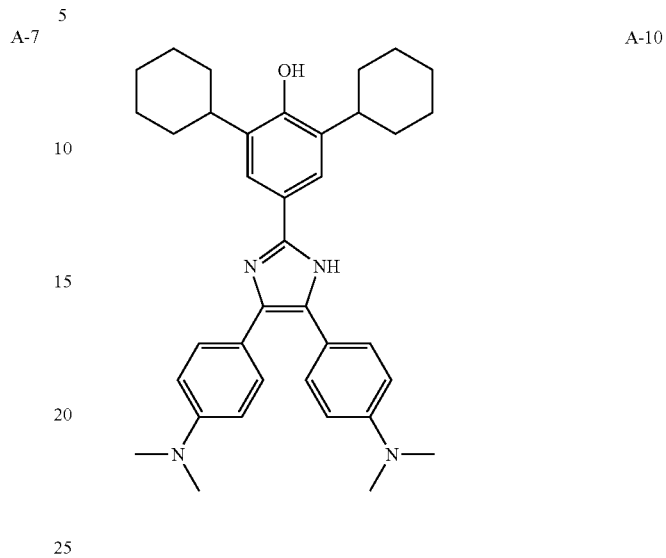
A-8
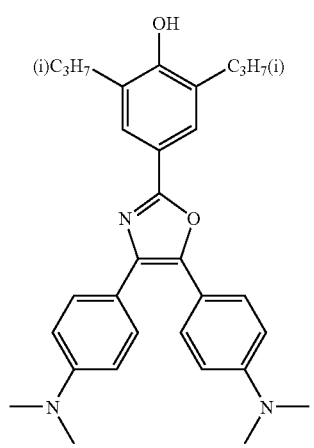
A-11
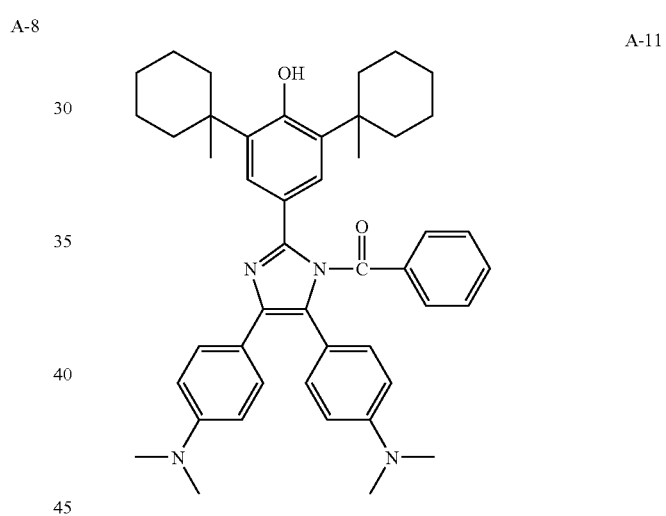
A-9
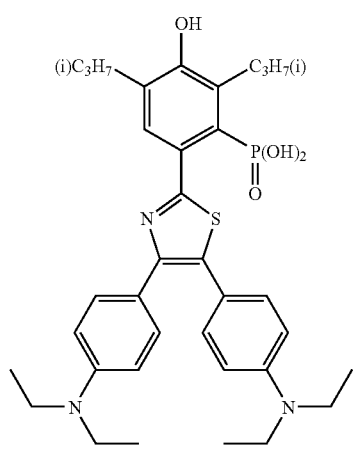
A-12
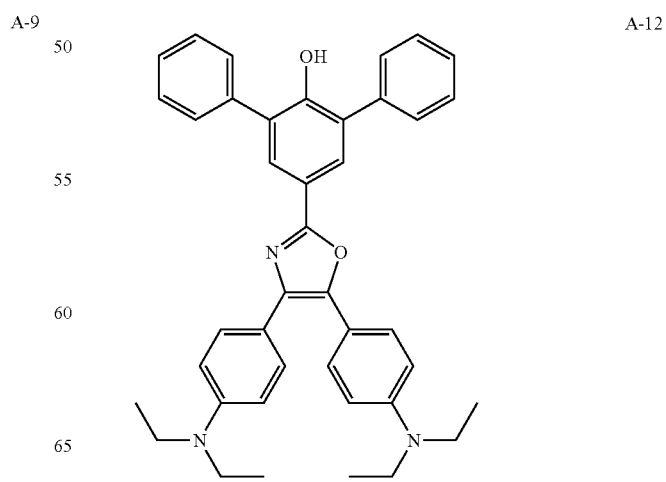

A-13
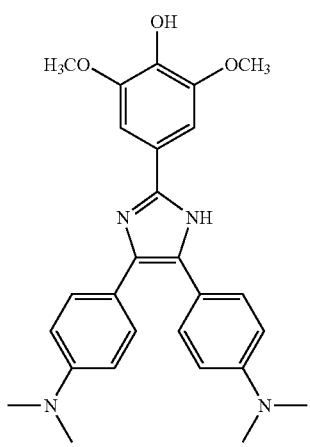
A-14
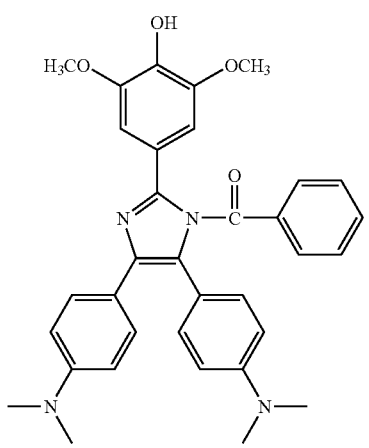
A-15
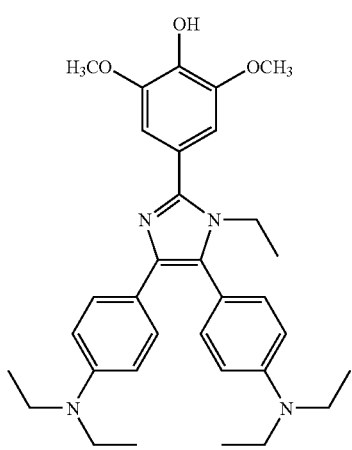
A-16
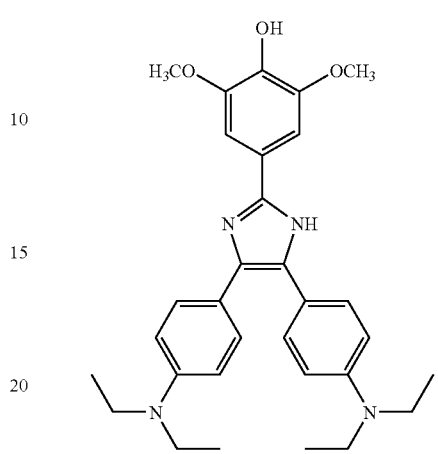
A-17
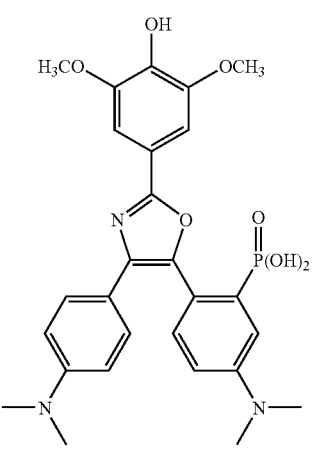
A-18
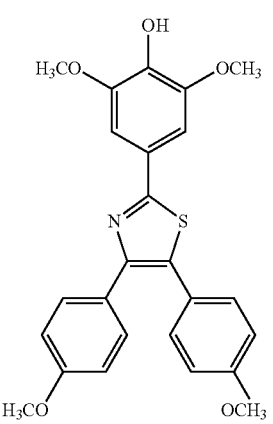

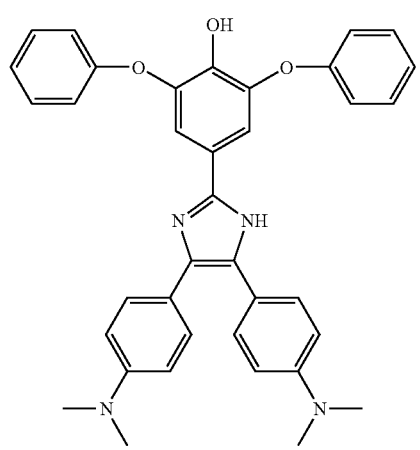
A-19
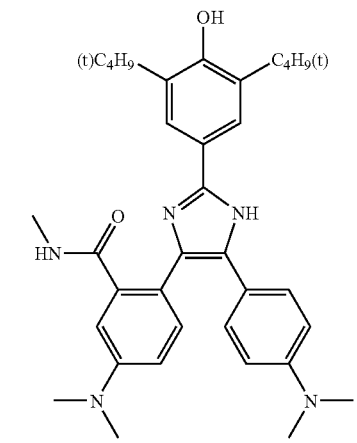
A-22
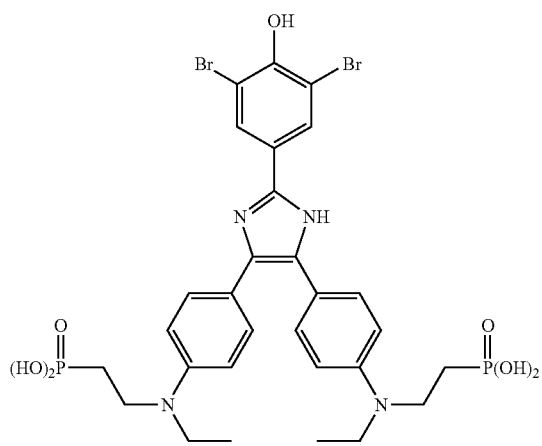
A-20
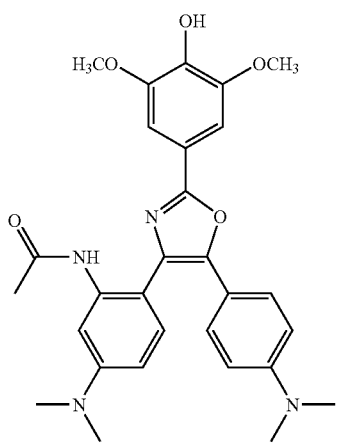
A-23
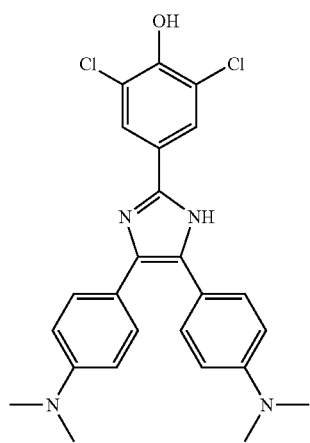
A-21
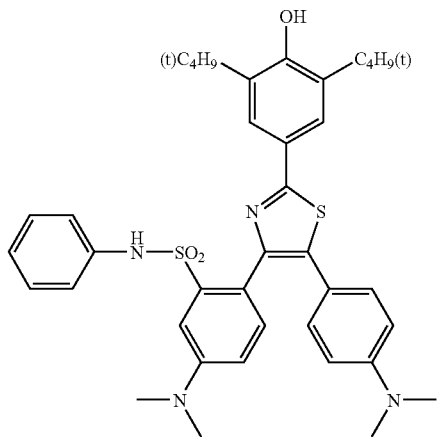
A-24

-continued
A-25
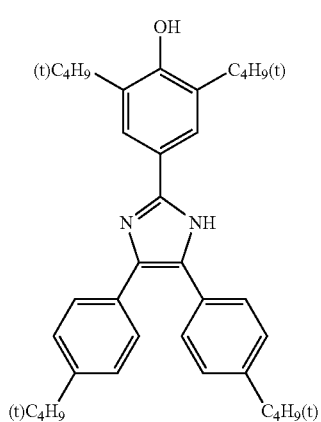
A-26
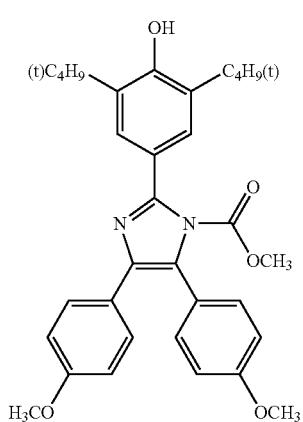
A-27
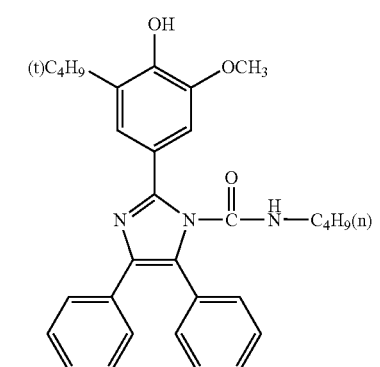
A-28
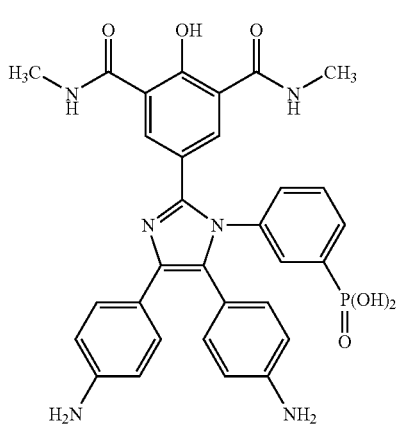
-continued
A-29
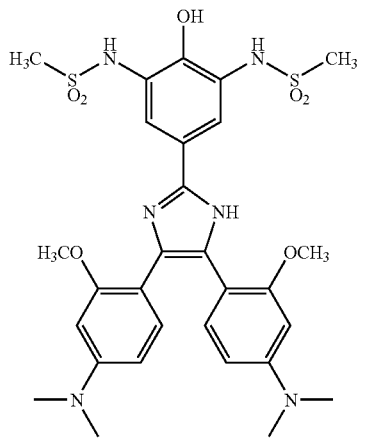
A-30
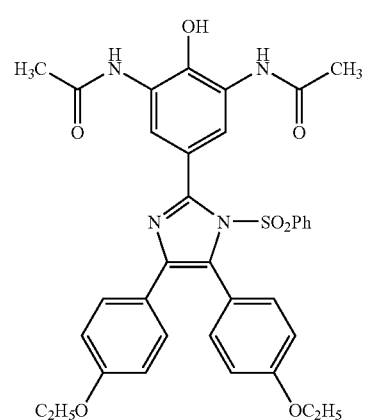
A-31
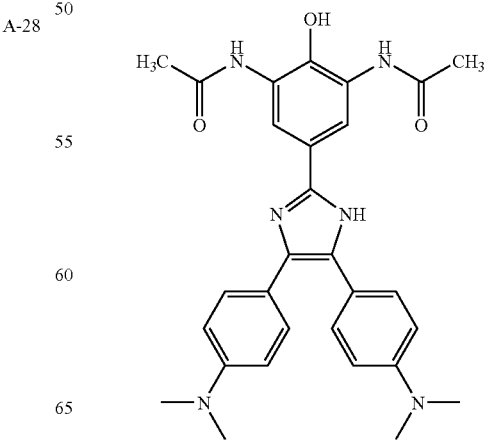

A-32 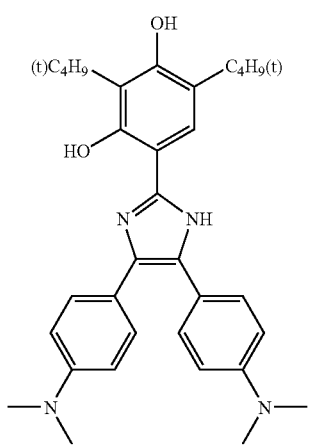
A-33 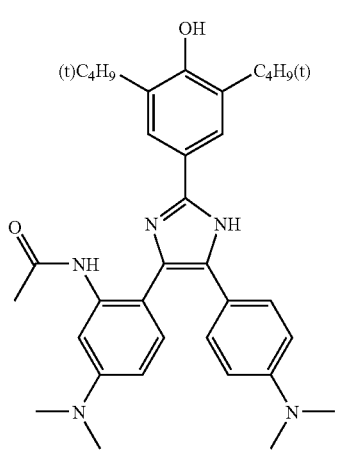
A-34 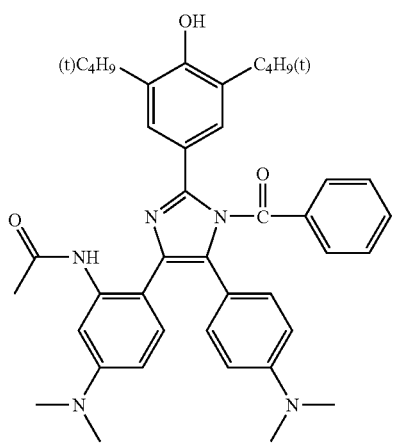
A-35 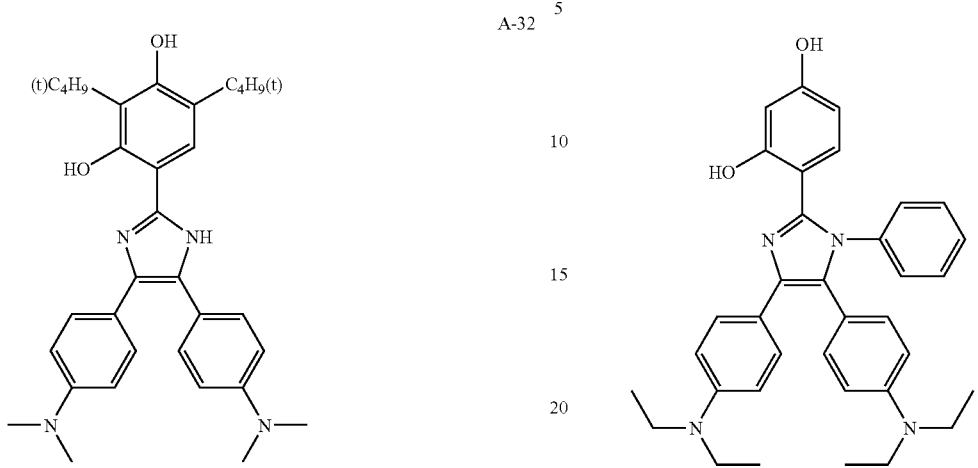
A-36 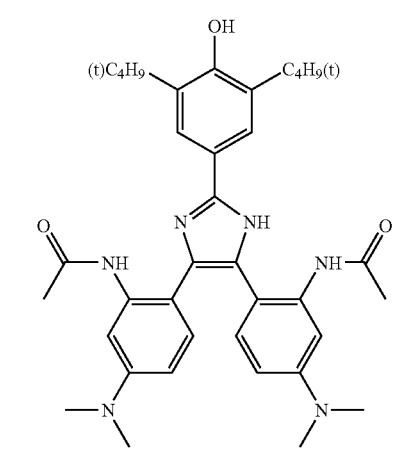
A-37 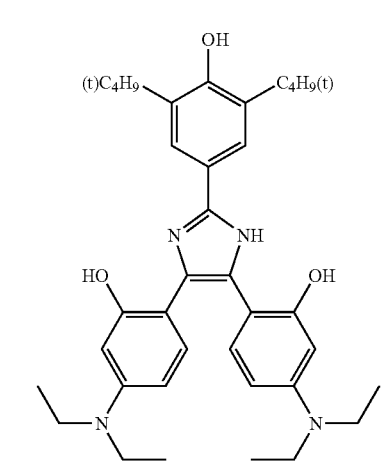

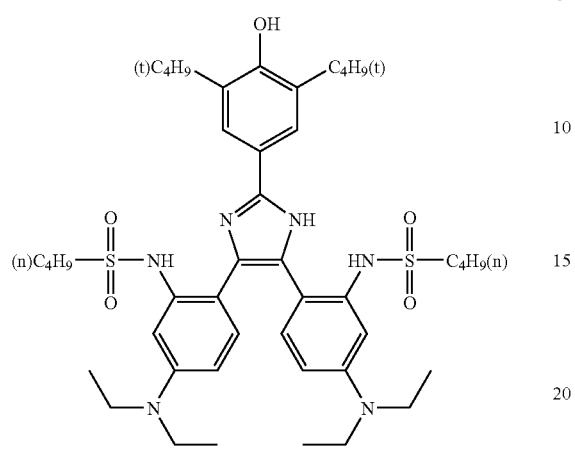
A-38
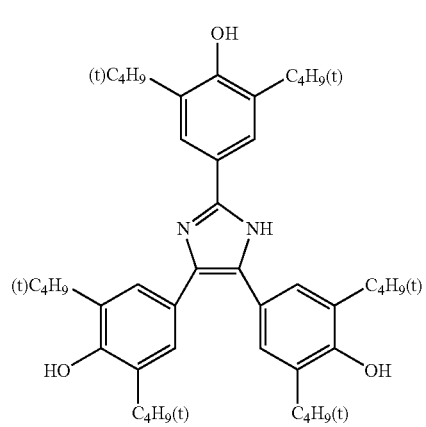
A-41
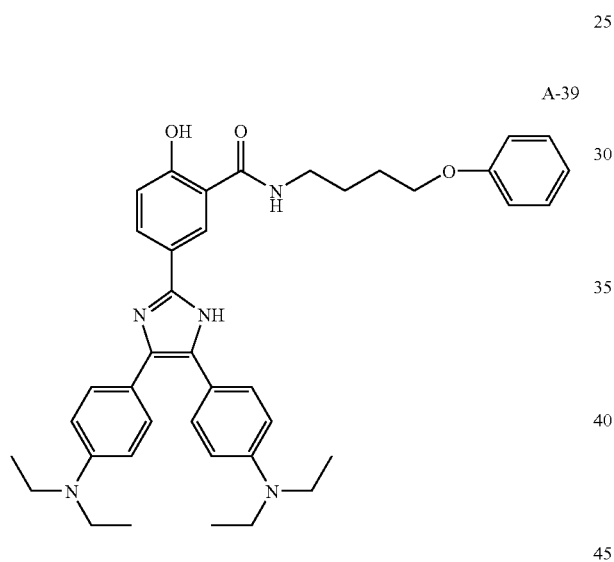
A-39
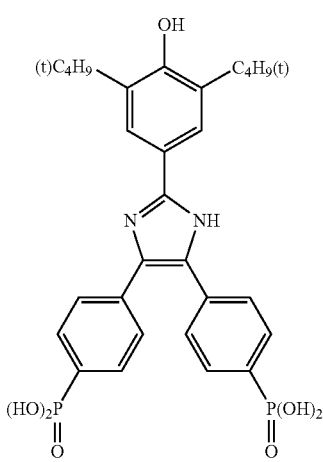
A-42
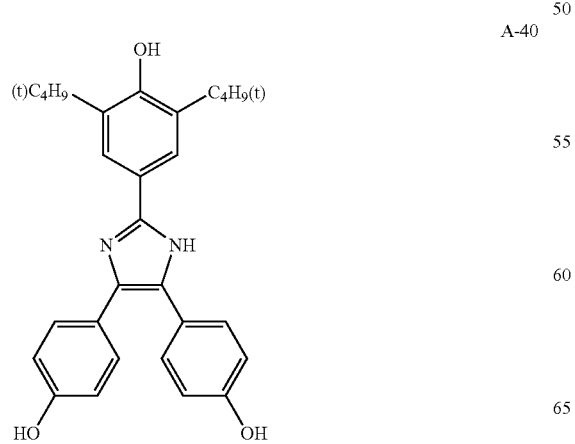
A-40
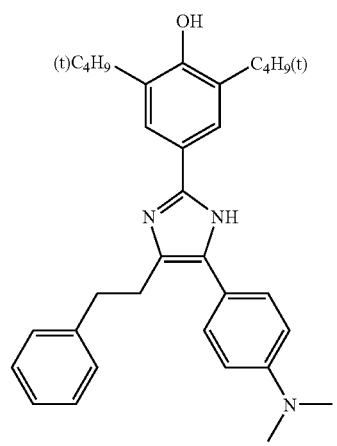
A-43

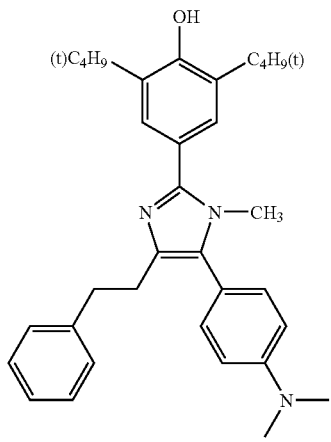
A-44
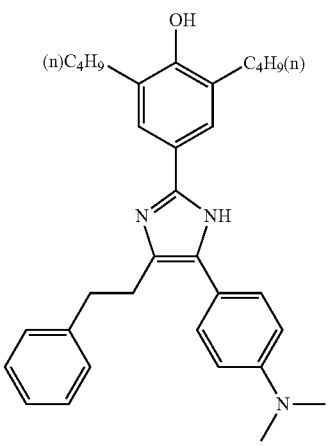
A-47
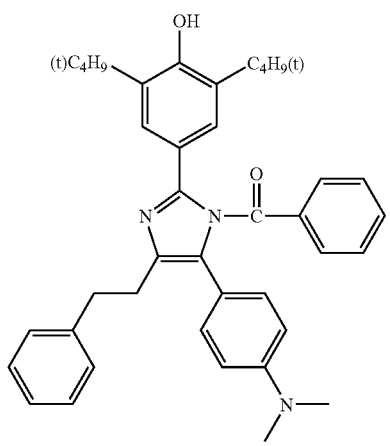
A-45
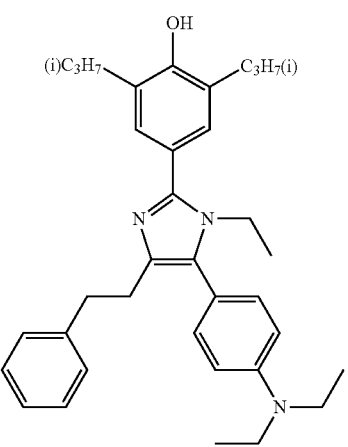
A-48
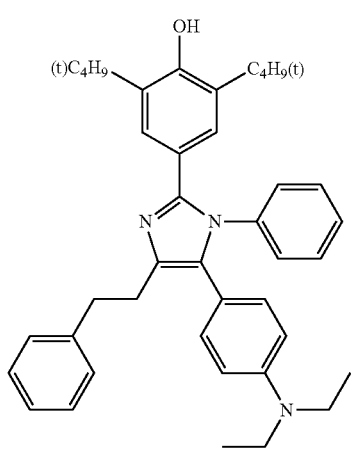
A-46
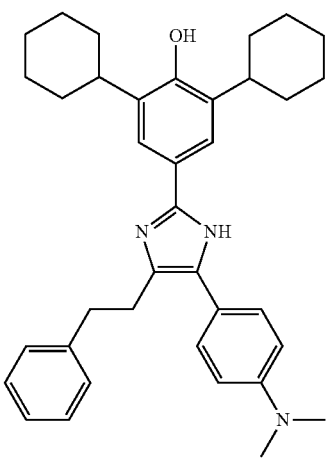
A-49

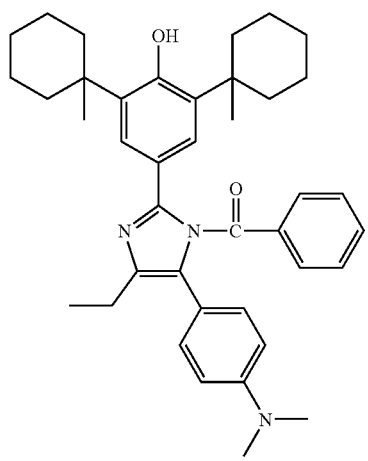
A-50
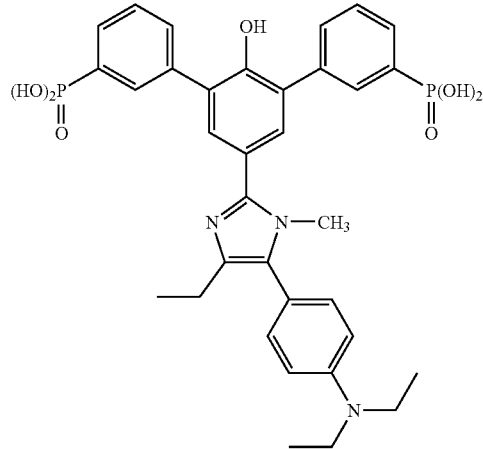
A-51
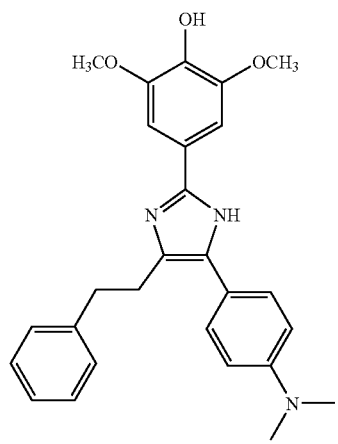
A-52
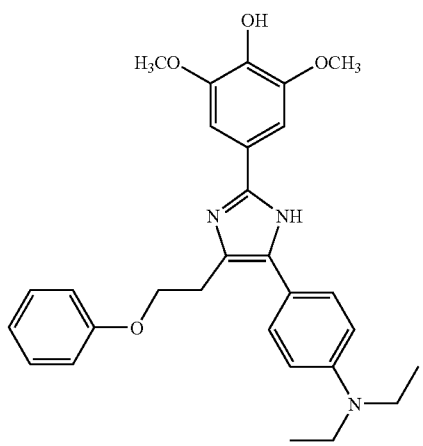
A-53
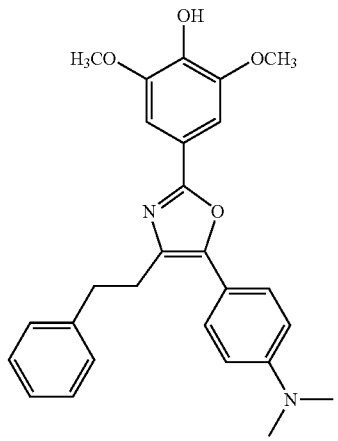
A-54
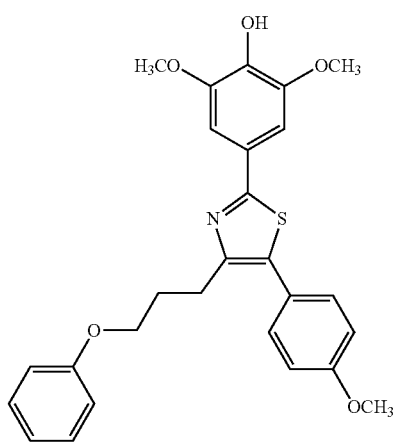
A-55

-continued
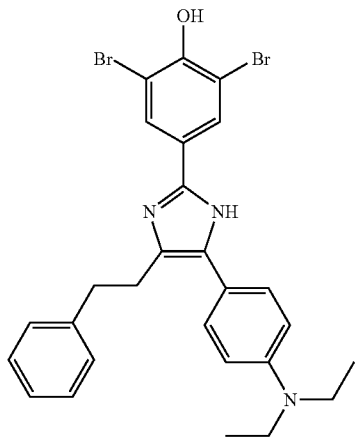
A-56
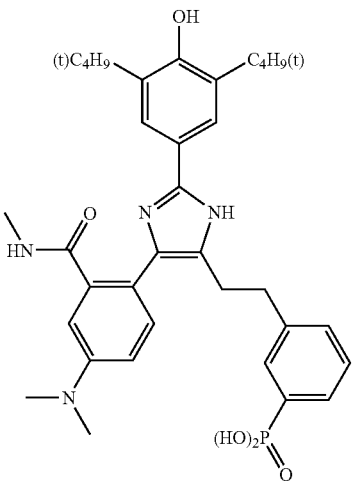
A-59
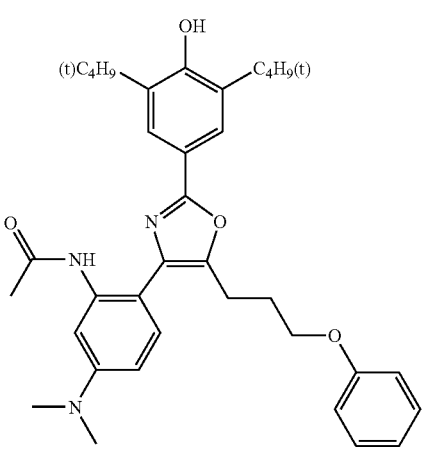
A-57
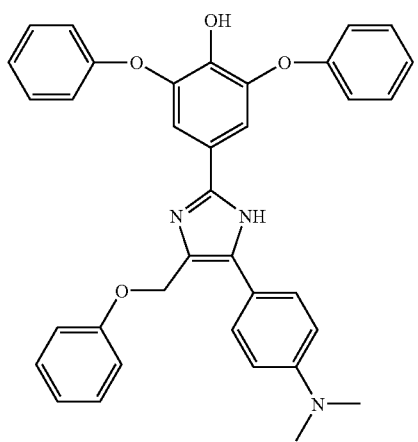
A-60
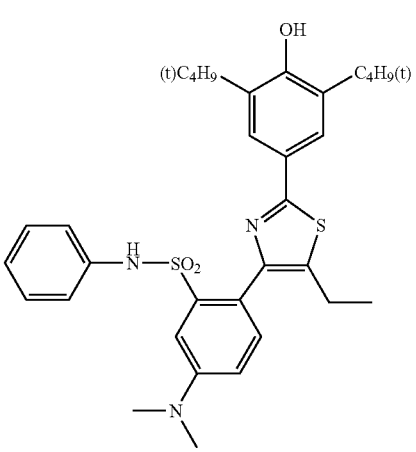
A-58
A-61

-continued
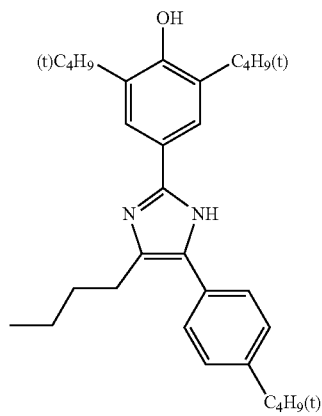
A-62
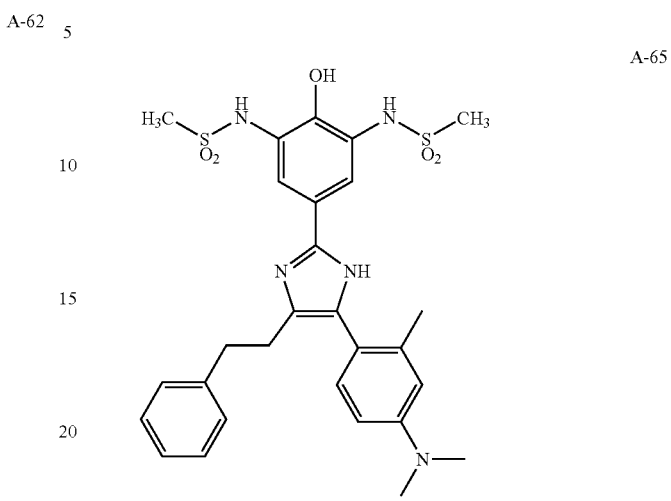
A-65
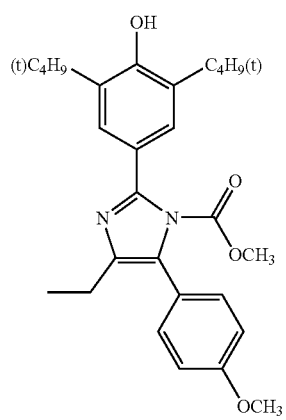
A-63
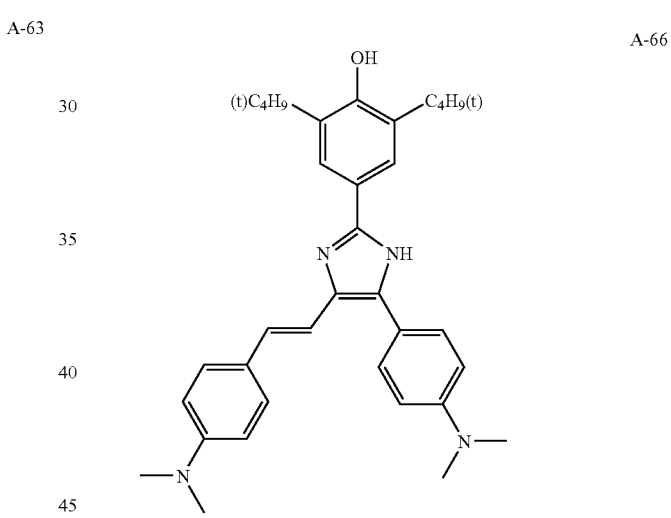
A-66
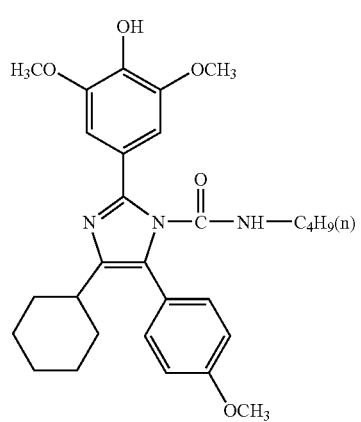
A-64
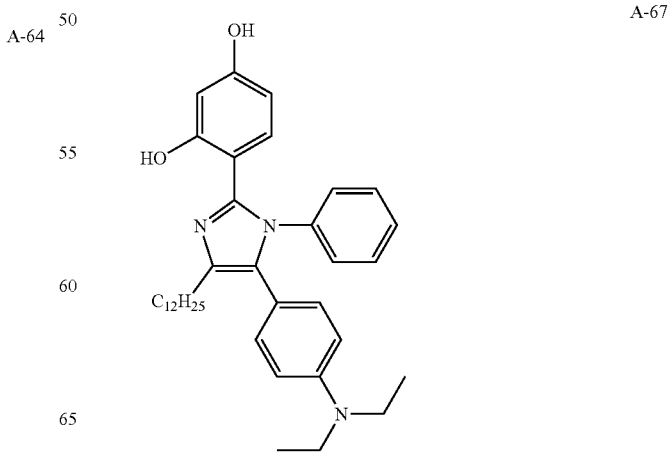
A-67

-continued
A-68
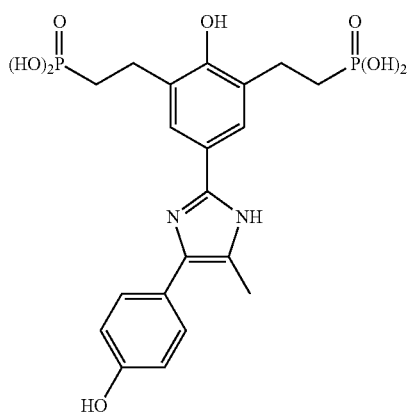
A-69
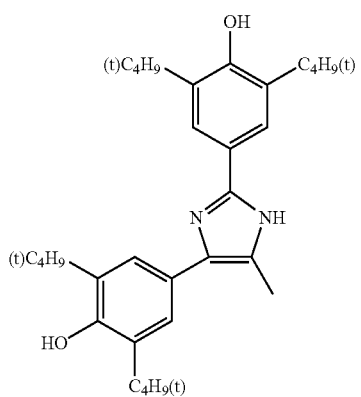
A-70
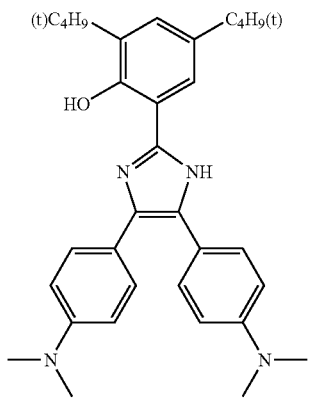
A-71
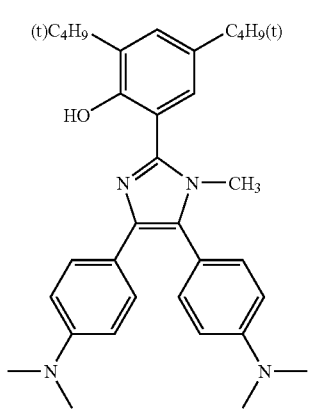
-continued
A-72
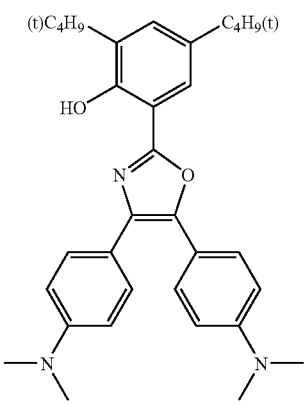
A-73
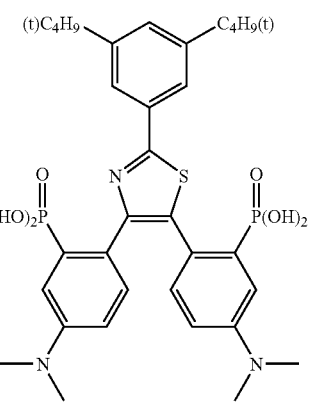
A-74
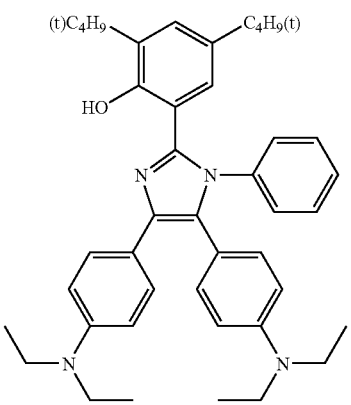
A-75
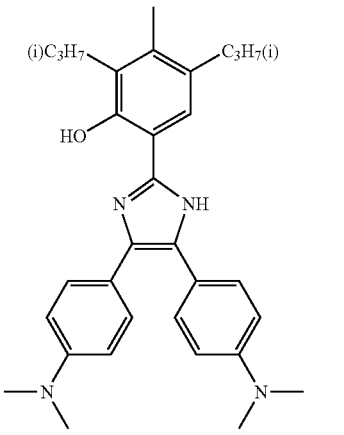

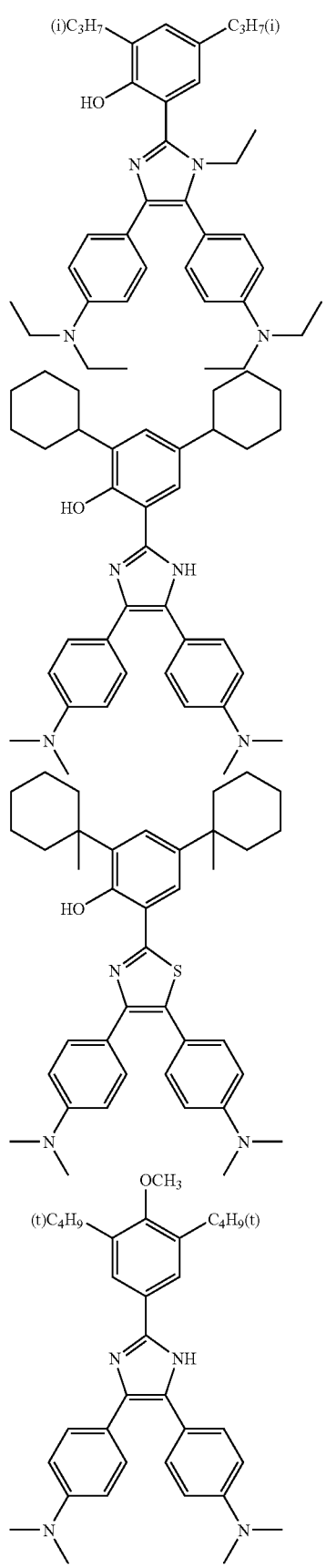
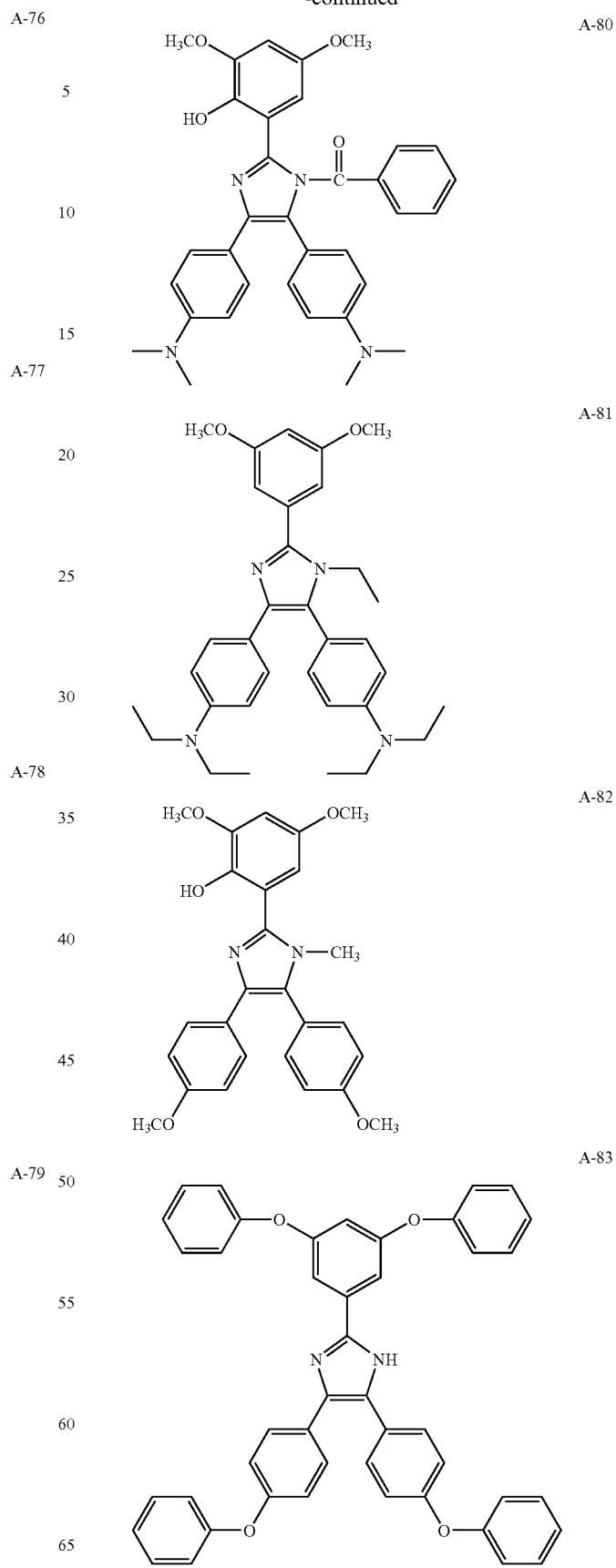

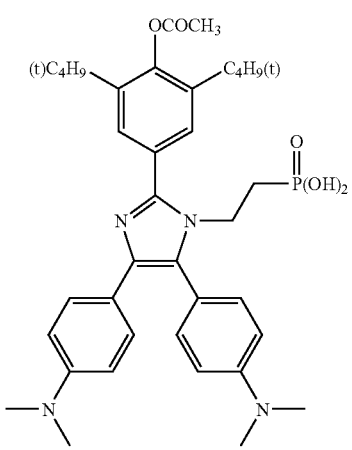
A-84
A-85
A-86
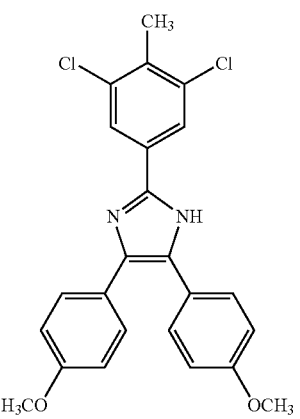
A-87
A-88
A-89

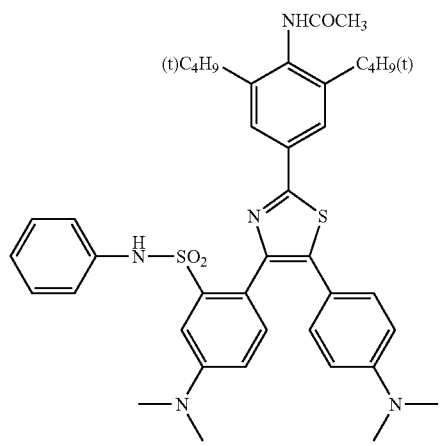
A-90
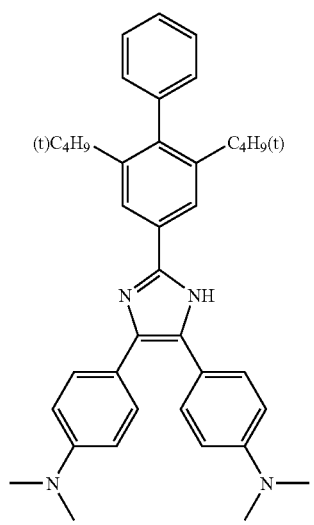
A-91
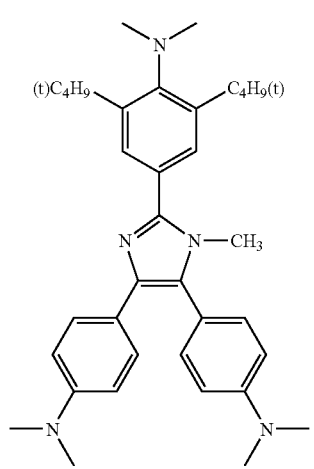
A-92
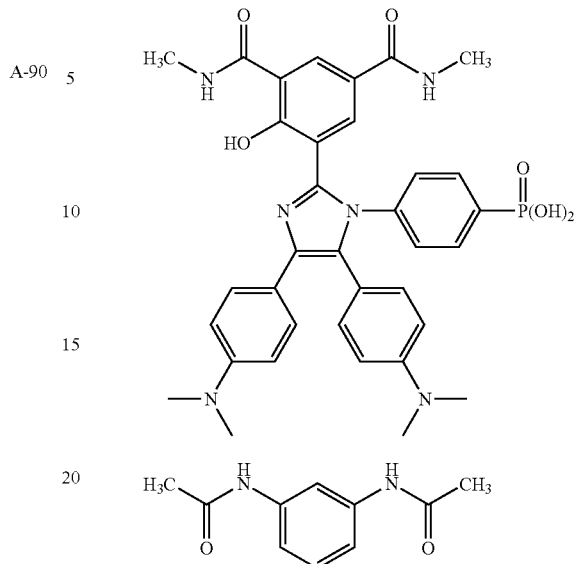
A-93
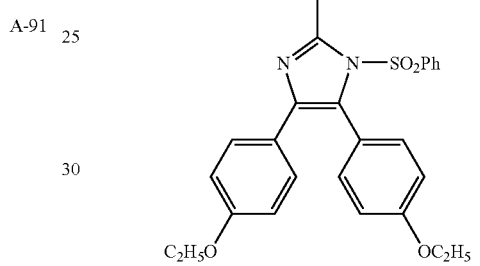
A-94
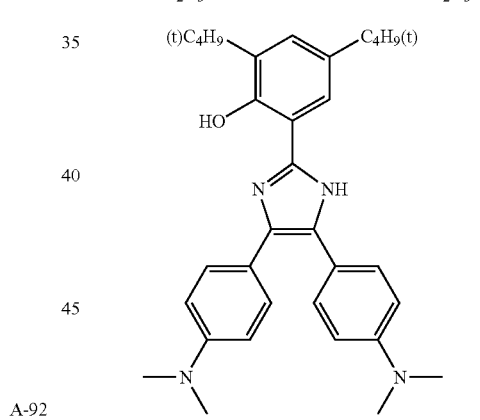
A-95
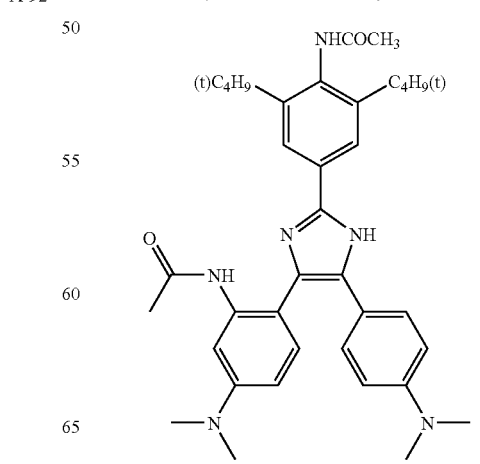
A-96

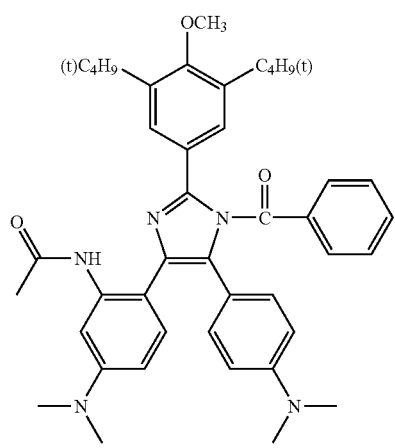
A-97
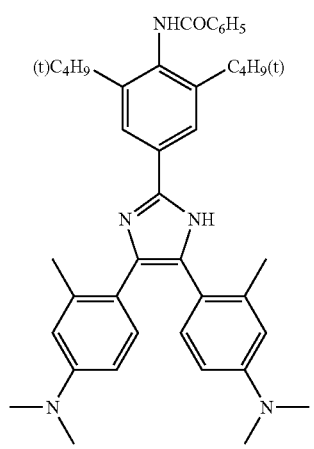
A-98
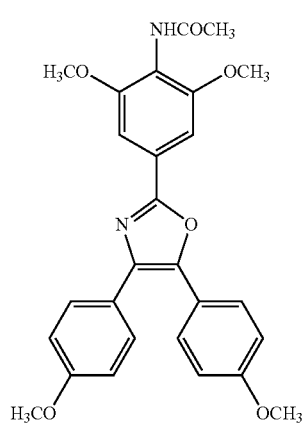
A-99
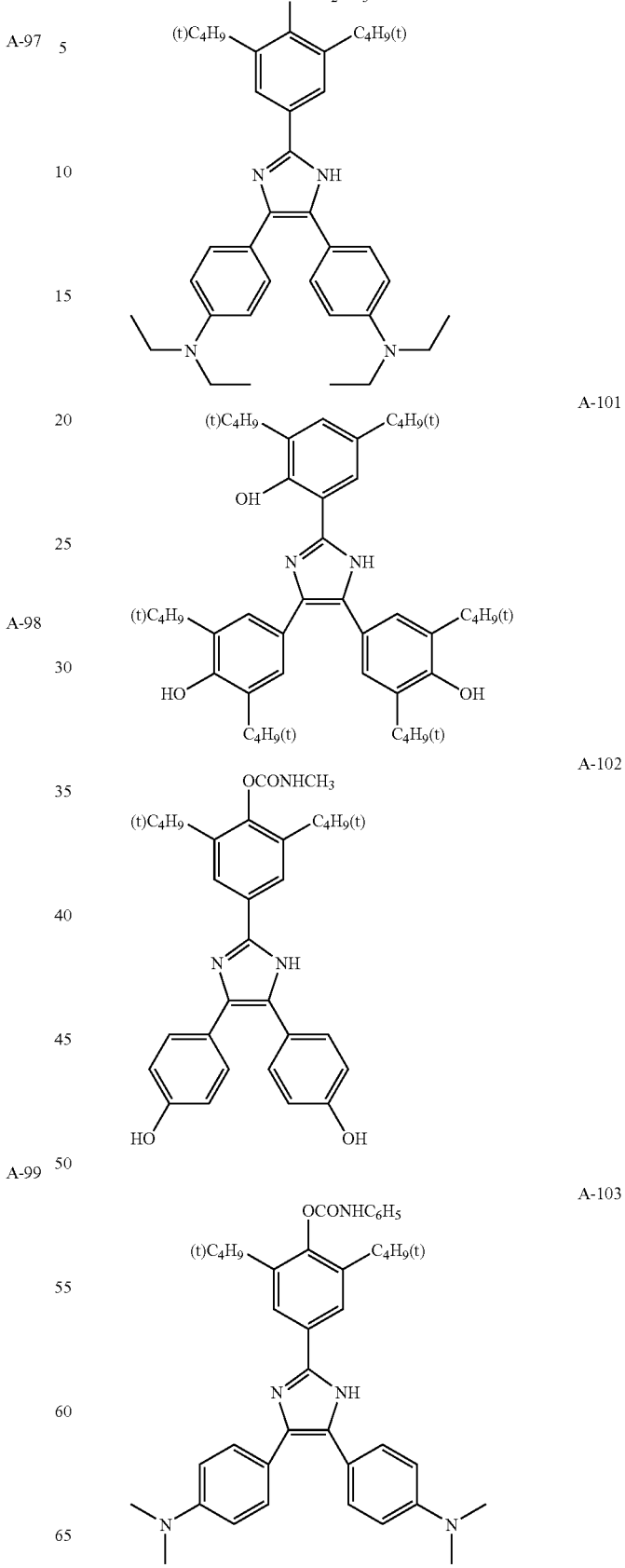

A-104
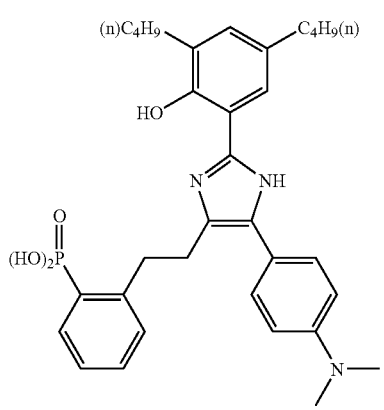
A-105
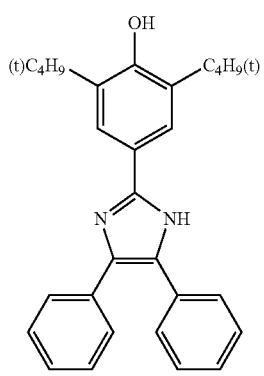
A-106
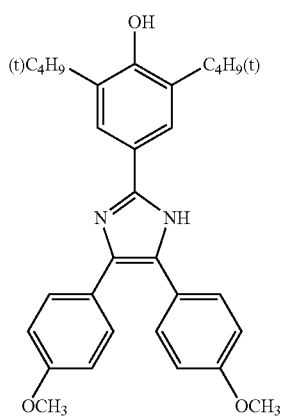
A-107
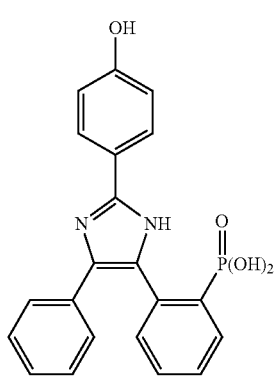
A-108
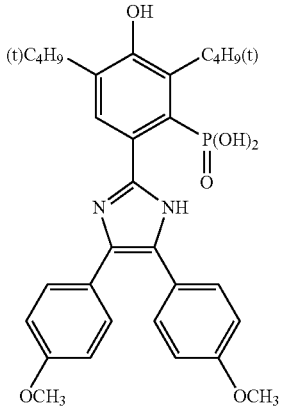
A-109
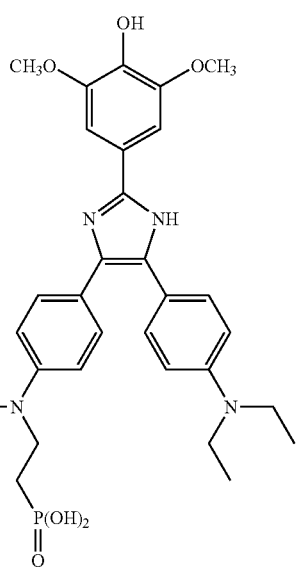
A-110
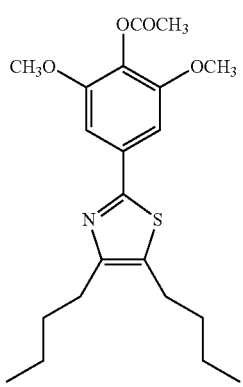

-continued

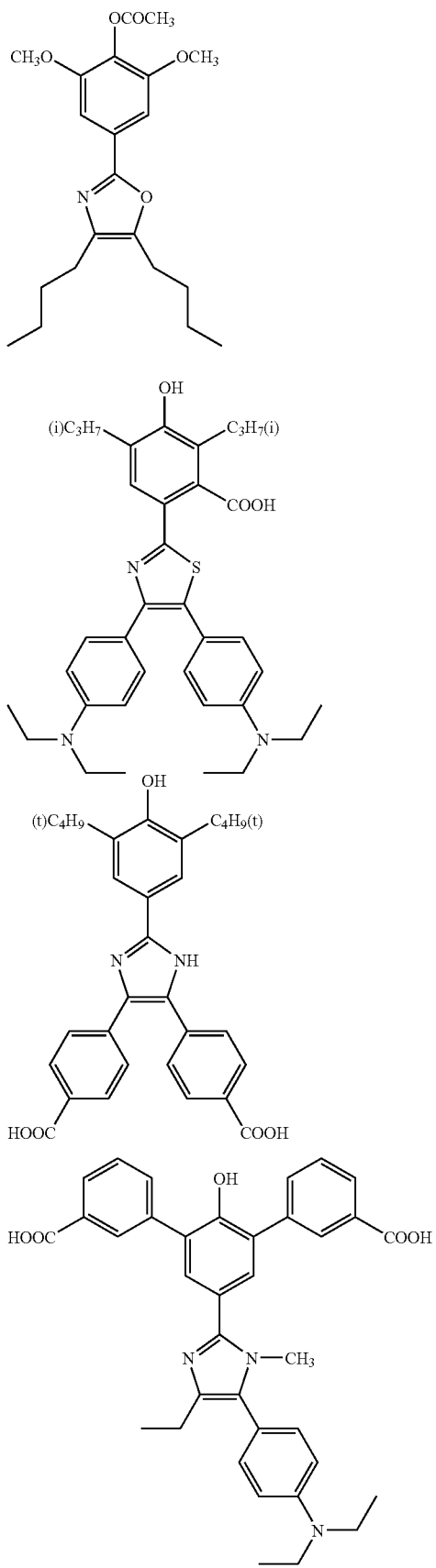

A-111

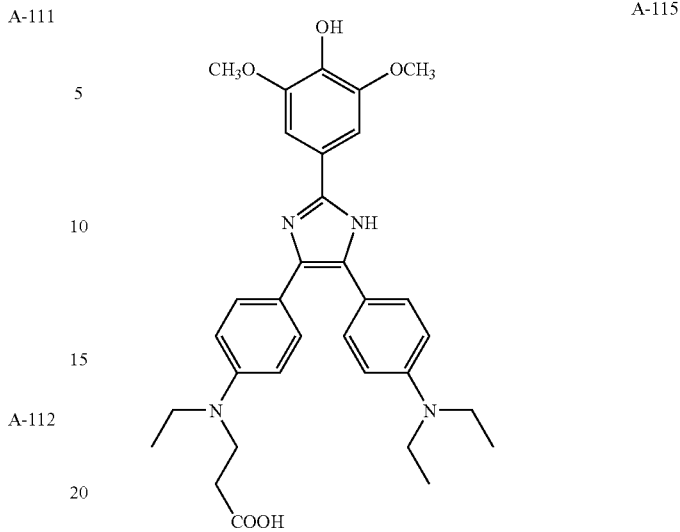

A-112

A-113

A-114

-continued

A-115

It is preferable that the compounds represented by Formula (A) have an absorbing group which absorbs chemically or physically to an electrode surface of the display element of this invention.

The chemical absorption referred to in this invention means relatively strong absorption state to the electrode surface via chemical bond, and the physical absorption means relative weak absorption state via Van der Waals force working between the electrode surface and the absorbing substance.

The absorbing group is preferably chemical absorption group, example of which preferably includes —COOH, —P═O(OH)$_2$, —OP═O(OH)$_2$ and —Si(OR)$_3$, wherein R is an alkyl group.

The compound represented by Formula (A) is immobilized on at least one of the counter electrodes, wherein the ratio of the region on which the compound represented by Formula (A) is immobilized to the region on which the compound is not immobilized is 1:4 to 4:1. The ratio of the region on which the compound represented by Formula (A) is immobilized to the region on which the compound is not immobilized is preferably 1:1 to 4:1.

The compound represented by Formula (A) is immobilized on only one of the counter electrodes in the principle composition.

Black image displayed as a result of dissolution deposition reaction of silver on the electrode on which the compound represented by (A) is immobilized.

Consequently, it is hard that the dissolution deposition reaction of silver on the electrode occurs when the electrode is fully covered with the compound represented by Formula (A), and a problem of insufficient black density generates.

It is intended to make both of color display by a redox reaction of the compound represented by Formula (A) and black and white display by a dissolution deposition reaction of silver available when a ratio of reaction site (immobilized region) to non-reaction site (non-immobilized region) is controlled based on the region on which the electrolyte containing silver ion is capable of contacting.

In case the immobilized region and non-immobilized region are provided on the electrode surface, each regions regularly is preferably arranged next to next, for example, preferably checked pattern or stripe pattern, in the arrangement of immobilized and non-immobilized region.

It is preferable to separate the immobilized region from non-immobilized region by in a thickness direction of layers in case that microparticles are superposed to form porous layer.

Practically, it is calculated by a ratio of projected area of immobilized region and non-immobilized region in case of plane film such as ITO film. Otherwise volume ratio of immobilized microparticles to non-immobilized microparticles is calculated in case that the porous layer is provides by applying microparticles.

Examples of patterns of arranging immobilizing region and non-immobilized region of the compound represented by Formula (A) are shown in FIGS. 1 to 4.

Figure 4:
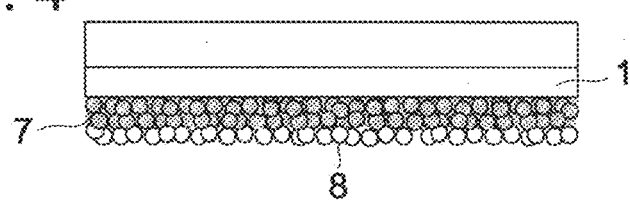
FIG. 4 is a schematic view showing a display element in which a layer in which the compound represented by Formula (A) of this invention is immobilized and a layer in which the compound represented by Formula (A) is not immobilized are superposed.
Figure 4:
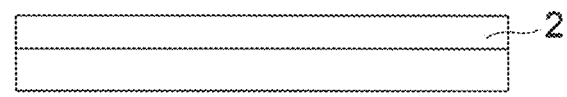

Examples of patterning methods to apply the compound represented by Formula (A) according to this invention to the electrode include a method applying the liquid dissolving the compound represented by Formula (A) in a suitable solvent via inkjet method or screen printing on the electrode to form a pattern (see, FIG. 1), a method applying the liquid mixing the compound represented by Formula (A) with electroconductive nano-particles via inkjet method or screen printing on the electrode to form a pattern, a method in which patterning is conducted by self-constitution method or coating method after subjecting electrode surface to processing to form high affinity region and low affinity region to liquid containing the compound represented by Formula (A), a method patterning the compound represented by Formula (A) on the nano-porous electrode by an inkjet method or screen printing (see, FIG. 2), a method to fix and immobilized the compound represented by Formula (A) only a surface layer of the nano-porous electrode (see, FIG. 3), and a method to form two layers of a layer immobilizing the compound represented by Formula (A) and a layer not immobilizing the compound represented by Formula (A) in which nano-porous electrode is formed after immobilizing the compound represented by Formula (A) on the whole nano-porous electrode (see, FIG. 4).

(Nano-Porous Electrode)

It is one of preferable feature that the electrode to which the compound represented by Formula (A) is immobilized is a nano-porous electrode having nano-porous structure in the display element of this invention.

The formation methods of the nano-porous electrode according to the present invention include: a method in which a layer containing a material constituting the electrode and a solvent is formed via, for example, an inkjet method, a screen printing method and a blade coating method using a dispersion containing the material constituting the electrode, followed by forming a porous layer by heating at a temperature of 120-300° C.; and a method in which, after an electrode layer is formed via, for example, a sputtering method, a CVD method and an atmospheric pressure plasma method, a nano-porous layer is formed by an anode oxidation method or a photoelectron-chemical etching method. Also, a nano-porous electrode can be prepared according to the method described in Adv. Mater. 2006, 18, 2980-2983.

The main component of the material which constitutes the nano-porous electrode according to the present invention can be selected from: metals such as Cu, Al, Pt, Ag, Pd, and Au; metal oxides such as ITO, $SnO_2$, $TiO_2$ and ZnO; and carbon electrodes such as carbon nano-tube, glassy carbon, diamond like carbon and nitrogen-containing carbon, and is preferably selected from metal oxides, such as ITO, $SnO_2$, $TiO_2$, and ZnO.

As the substrate on which a nano-porous electrode is formed, either glass or a plastic resin may be used. The nano-porous layer according to the present invention may be formed after a conductive layer of metal or metal oxide is formed on glass or plastic resin.

The term of porous as used in the present invention refers to a state which enables that, after an electrolyte is provided on a nano-porous electrode, the nano-porous electrode is sandwiched with another electrode and when a potential difference is applied between the opposing electrodes, and ion species is mobile in the nano-porous electrode.

The thickness of the nano-porous electrode is preferably 100-1,500 nm and more preferably 250-1,000 nm.

Metal Salt Compound

The metal salt compound of the present invention may be any kind of compound as long as the compound is a metal salt containing a metal species which can be deposited on or dissolved from one of a pair of opposing electrodes by a driving operation between the pair of electrodes. Examples of a preferable metal species include: silver, bismuth, copper, nickel, iron; chromium and zinc. Of these, silver and bismuth are specifically preferable.

Silver Salt Compound

The silver salt compound according to the present invention is a general term including silver and a compound containing silver in the chemical structure, for example, silver oxide, silver sulfide, metallic silver, silver colloid particles, silver halide, a silver complex compound, or a silver ion. The state of phase, such as solid state, solubilized state to a liquid, or gaseous state, and charge state such as neutral, anionic or cationic, are not specifically limited.

Silver ion concentration in the electrolyte according to the present invention is preferably 0.2 mol/kg≦[Metal]≦2.0 mol/kg. When the silver ion concentration is at most 0.2 mol/kg, a diluted silver solution is formed to lower the driving rate, while when it exceeds 2 mol/kg, solubility is degraded to tend to result in inconvenience of deposition during storage at low temperature.

(Concentration Ratio of Halogen Ion and Silver Ion)

It is preferable to satisfy the conditions specified by following Formula (1) in the display element of the present invention, wherein [X] is mol concentration of a halogen ion or a halogen atom in the electrolyte in mol/kg, and [Metal] is the total mol concentration of silver or a compound containing silver in its molecule in the electrolyte in mol/kg:

$$0 \leqq [X]/[Metal] \leqq 0.1 \qquad \text{Formula (1)}$$

Halogen atoms, as described in the present invention refer to any of the iodine, chloride, bromine, and fluorine atoms. When [X]/[Metal] is at least 0.1, during oxidation-reduction reaction of silver, $X^- \rightarrow X_2$ occurs. This reaction becomes one of the factors in which $X_2$ easily undergoes cross oxidation with blackened silver to dissolve blackened silver, resulting in a decrease in memory capability. Consequently, it is preferable that the mol concentration of halogen atoms is as low as possible with respect to the mol concentration of silver. In the present invention, $0 \leqq [X]/[Metal] \leqq 0.001$ is more preferred. When halogen ions are added, in view of enhancement of memory capability, the sum of mol concentration of each of the halogen species is [I]<[Br]<[Cl]<[F].

It is preferable that the electrolyte contains the compound represented by Formula (1) or (2) in the display of this invention.

In Formula (1), $R_{11}$ and $R_{12}$ each represent a substituted or unsubstituted hydrocarbon group, which includes an aromatic straight chain group or branched chain group. Further, these hydrocarbon groups may contain at least one of a nitrogen atom, an oxygen atom, a phosphorous atom, a sulfur atom, and a halogen atom. However, when a ring containing an S atom is formed, no aromatic group is employed.

Listed as a substitutable group to the hydrocarbon group may, for example, be an amino group, a guanidino group, a quaternary ammonium group, a hydroxyl group, a halogen compound, a carboxyl group, a carboxylate group, an amido group, a sulfinic acid group, a sulfonic acid group, a sulfate group, a phosphonic acid group, a phosphate group, a nitro group, and a cyano group.

It is necessary to have silver solubilized in an electrolyte in order to result in dissolution and deposition of silver in general. Namely, it is common to employ a method in which silver or silver-containing compound is modified to be soluble compound via coexistence of a compound containing chemical structure species which result in mutual interaction with silver, which forms a coordination bond with silver or forms a weak covalent bond with silver. Known as the above chemical structure species are a halogen atom, a mercapto group, a carboxyl group, an imino group and so on. In the present invention, a thioether group also usefully acts as a silver solvent and exhibits features such as minimal effects to coexisting compounds and high solubility in solvents.

Specific examples of the compounds represented by Formula (1) according to the present invention will now be cited, however the present invention is not limited to the exemplified compounds.

1-1: $CH_3SCH_2CH_2OH$
1-2: $HOCH_2CH_2SCH_2CH_2OH$
1-3: $HOCH_2CH_2SCH_2CH_2SCH_2CH_2OH$
1-4: $HOCH_2CH_2SCH_2CH_2SCH_2CH_2SCH_2CH_2OH$
1-5: $HOCH_2CH_2SCH_2CH_2OCH_2CH_2OCH_2CH_2SCH_2CH_2OH$
1-6: $HOCH_2CH_2OCH_2CH_2SCH_2CH_2SCH_2CH_2OCH_2CH_2OH$
1-7: $H_3CSCH_2CH_2COOH$
1-8: $HOOCCH_2SCH_2COOH$
1-9: $HOOCCH_2CH_2SCH_2CH_2COOH$
1-10: $HOOCCH_2SCH_2CH_2SCH_2COOH$
1-11: $HOOCCH_2SCH_2CH_2SCH_2CH_2SCH_2CH_2SCH_2COOH$
1-12: $HOOCCH_2CH_2SCH_2CH_2SCH_2CH(OH)CH_2SCH_2CH_2SCH_2CH_2COOH$
1-13: $HOOCCH_2CH_2SCH_2CH_2SCH_2CH(OH)CH(OH)CH_2SCH_2CH_2SCH_2CH_2COOH$
1-14: $H_3CSCH_2CH_2CH_2NH_2$
1-15: $H_2NCH_2CH_2SCH_2CH_2NH_2$
1-16: $H_2NCH_2CH_2SCH_2CH_2SCH_2CH_2NH_2$
1-17: $H_3CSCH_2CH_2CH(NH_2)COOH$
1-18: $H_2NCH_2CH_2OCH_2CH_2SCH_2CH_2SCH_2CH_2OCH_2CH_2NH_2$
1-19: $H_2NCH_2CH_2SCH_2CH_2OCH_2CH_2OCH_2CH_2SCH_2CH_2NH_2$
1-20: $H_2NCH_2CH_2SCH_2CH_2SCH_2CH_2SCH_2CH_2SCH_2CH_2NH_2$
1-21: $HOOC(NH_2)CHCH_2CH_2SCH_2CH_2SCH_2CH_2CH(NH_2)COOH$
1-22: $HOOC(NH_2)CHCH_2SCH_2CH_2OCH_2CH_2OCH_2CH_2SCH_2CH(NH_2)COOH$
1-23: $HOOC(NH_2)CHCH_2OCH_2CH_2SCH_2CH_2SCH_2CH_2OCH_2CH(NH_2)COOH$
1-24: $H_2N(O=)CCH_2SCH_2CH_2OCH_2CH_2OCH_2CH_2SCH_2C(=O)NH_2$
1-25: $H_2N(O=)CCH_2SCH_2CH_2SCH_2C(=O)NH_2$
1-26: $H_2NHN(O=)CCH_2SCH_2CH_2SCH_2C(=O)NHNH_2$
1-27: $H_3C(O=)CNHCH_2CH_2SCH_2CH_2SCH_2CH_2NHC(=O)CH_3$
1-28: $H_2NO_2SCH_2CH_2SCH_2CH_2SCH_2CH_2SO_2NH_2$
1-29: $NaO_3SCH_2CH_2CH_2SCH_2CH_2SCH_2CH_2CH_2SO_3Na$
1-30: $H_3CSO_2NHCH_2CH_2SCH_2CH_2SCH_2CH_2NHO_2SCH_3$
1-31: $H_2N(NH)CSCH_2CH_2SC(NH)NH_2 \cdot 2HBr$
1-32: $H_2N(NH)CSCH_2CH_2OCH_2CH_2OCH_2CH_2SC(NH)NH_2 \cdot 2HCl$
1-33: $H_2N(NH)CNHCH_2CH_2SCH_2CH_2SCH_2CH_2NHC(NH)NH_2 \cdot 2HBr$
1-34: $[(CH_3)_3NCH_2CH_2SCH_2CH_2SCH_2CH_2N(CH_3)_3]^{2+} \cdot 2Cl^-$

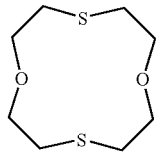

1-35

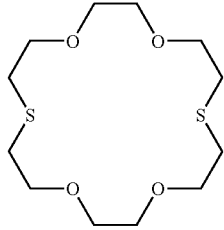

1-36

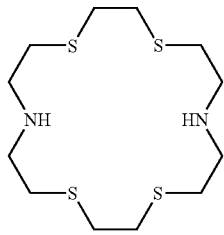

1-37

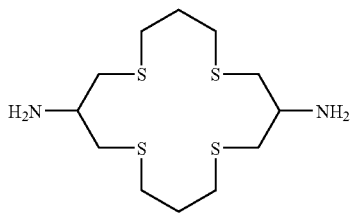

1-38

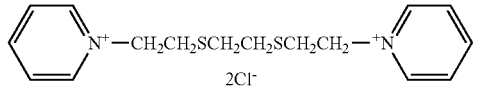

1-39

1-40

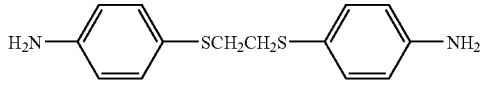

1-41

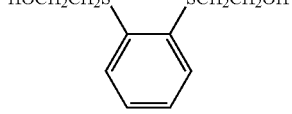

1-42

1-43

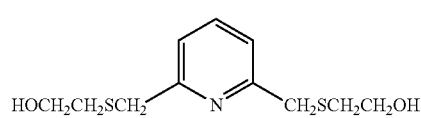

1-44

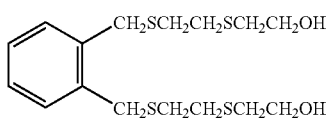

1-45

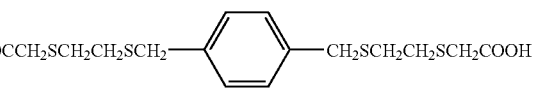

1-46

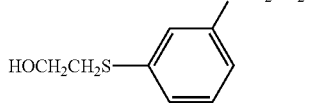

1-47

Compound 1-2 is specifically preferred among the above exemplified compounds in view of realizing the purposes and effects of the present invention.

The compounds represented by Formula (2) according to the present invention will now be described.

In above Formula (4), M represents a hydrogen atom metal atom or quaternary ammonium; Z represents a nitrogen-containing heterocyclic ring except for imidazole rings; n represents an integer of 0 to 5; $R_9$ represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxy carbonyl group, an aryloxycarbonyl group, an alkylcarbonyl group, an arylcarbonyl group, an acyloxy group, a carboxyl group, a carbonyl group, a sulfonyl group, an amino group, a hydroxyl group, or a heterocyclyl group. When n represent at least 2, each $R_9$ may be the same or different, and may be joined to form a condensed ring.

Examples of the nitrogen-containing heterocyclic rings represented by Z of Formula (2) include a tetrazole ring, a triazole ring, an imidazole ring, an oxadiazole ring, a thiadiazole ring, an indole ring, an oxazole ring, a benzoxazole ring, a benzimidazole ring, a benzothiazole ring, a benzoselenazole ring, and a naphthoxazole ring.

Examples of the halogen atoms represented by $R_9$ of Formula (2) include a fluorine atom, a chlorine atom, a bromine atom and a iodine atom; examples of the alkyl groups include a methyl group, an ethyl group, a propyl group, an i-propyl group, a butyl group, a t-butyl group, a pentyl group, a cyclopentyl group, a hexyl group, a cyclohexyl group, an octyl-group, a dodecyl group, a hydroxyethyl group, a methoxyethyl group, a trifluoromethyl group, and a benzyl group; examples of the aryl group include a phenyl group and a naphthyl group; examples of the alkylcarbonamido group include an acetylamino group, a propionylamino group, and a butyroylamino group; examples of the arylcarbonamido group include a benzoylamino group; examples of the alkylsulfonamido group include a methanesulfonylamino group and an ethanesulfonylamino group; examples of the arylsulfonamido group include a benzenesulfonylamino group and a toluenesulfonylamino group; examples of the aryloxy group include a phenoxy group; examples of the alkylthio group include a methylthio group, an ethylthio group, and a butylthio group; examples of the arylthio group include a phenylthio group and a tolylthio group; examples of the alkylcarbamoyl group include a methylcarbamoyl group, a dimethylcarbamoyl group, an ethylcarbamoyl group, a diethylcarbamoyl group, a dibutylcarbamoyl group, a piperidylcarbamoyl group, and a morphorylcarbamoyl group; examples of the arylcarbamoyl group include a phenylcarbamoyl group, a methylphenylcarbamoyl group, an ethylphenylcarbamoyl group, and a benzylphenylcarbamoyl group; examples of the alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group, and a morphorylsulfamoyl group; examples of the arylsulfamoyl group include a phenylsulfamoyl group, a methylphenylsulfamoyl group, an ethylphenylsulfamoyl group, and a benzylphenylsulfamoyl group; examples of the alkylsulfonyl group include a methanesulfonyl group and an ethanesulfonyl group; examples of the arylsulfonyl group include a phenylsulfonyl group, a 4-chlorophenylsulfonyl group, and a p-toluenesulfonyl group; examples of the alkoxycarbonyl group include a methoxycarbonyl group, an ethoxycarbonyl group, and a butoxycarbonyl group; examples of the aryloxycarbonyl group include a phenoxycarbonyl group; examples of the alkylcarbonyl group include an acetyl group, a propionyl group, and a butyroyl group; examples of the arylcarbonyl group include a benzoyl group and an alkylbenzoyl group; examples of the acyloxy group include an acetyloxy group, a propionyloxy group, and a butyroyloxy group; examples of the heterocyclyl group include an oxazole ring, a thiazole ring, a triazole ring, a selenazole ring, a tetrazole ring, an oxadiazole ring, a thiadiazole ring, a thiazine ring, a triazine ring, a benzoxazole ring, a benzothiazole ring, an indolenine ring, a benzoselenazole ring, a naphthothiazole ring, a triazaindolizine ring, a diazaindolizine ring, and a tetraazaindolizine ring. These substituents include those which have a substituent.

Specific examples of the preferred compounds represented by Formula (2) will now be cited, however the present invention is not limited these compounds.

2-1

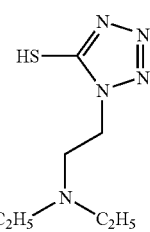

2-2

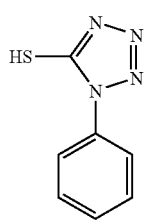

2-3 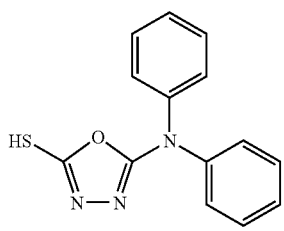

2-4 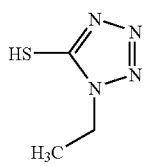

2-5 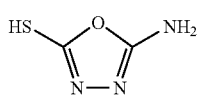

2-6 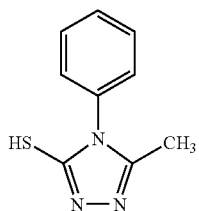

2-7 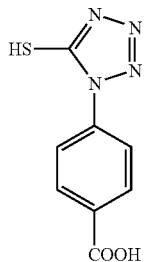

2-8 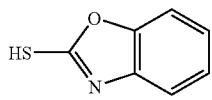

2-9 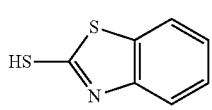

2-10 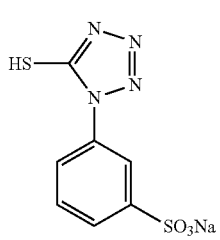

2-11 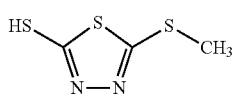

2-12 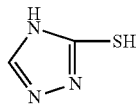

2-13 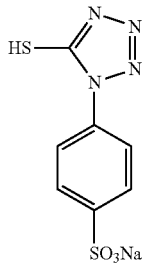

2-14 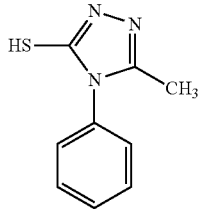

2-15 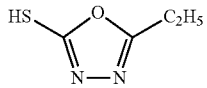

2-16 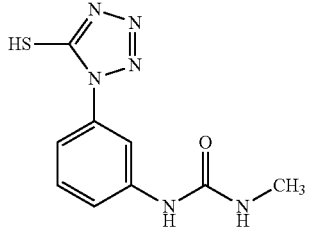

2-17 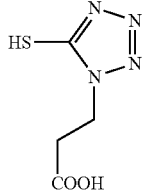

2-18 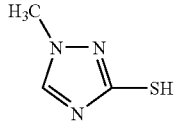

2-19 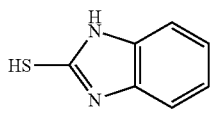

Specifically preferred are Exemplified Compounds 2-12 and 2-18 among the compounds exemplified as above, in view of satisfactorily realizing the objects and effects of the present invention.

(Compounds Represented by Formulas (3) and (4))

In the display element of the present invention, it is preferable that the electrolyte contains a compound represented by above Formula (3) or (4).

Initially, the compounds represented by Formula (3), according to the present invention, will now be described.

In above Formula (1), L represents an oxygen atom or $CH_2$, and each of $R_1$-$R_4$ represents a hydrogen atom, an alkyl group, an alkenyl group, an aryl group, a cycloalkyl group, an alkoxyalkyl group, or an alkoxy group.

Examples of the alkyl group include a methyl group, an ethyl group, a propyl group, an isopropyl group, a tert-butyl group, a pentyl group, a hexyl group, an octyl group, a dodecyl group, a tridecyl group, a tetradecyl group, and a pentadecyl group, examples of the aryl group include a phenyl group, and a naphthyl group, examples of the cycloalkyl group include a cyclopentyl group, and a cyclohexyl group, examples of the alkoxyalkyl group include a β-methoxymethyl group, a γ-methoxy propyl group, and examples of the alkoxy group include a methoxy group, an ethoxy group, a propyloxy group, a pentyloxy group, a hexyloxy group, an octyloxy group, and a dodecyloxy group.

Specific examples of the compounds represented by Formula (1), according to the present invention, will now be cited, however, the present invention is not limited thereto.

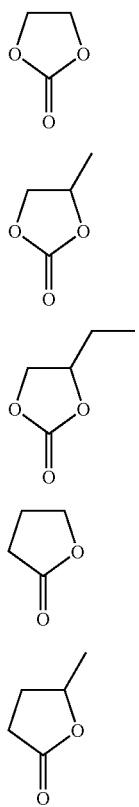

The compounds represented by Formula (4), according to the present invention, will now be described.

In above Formula (4), each of $R_5$ and $R_6$ represents a hydrogen atom, an alkyl group, an alkenyl group, an aryl group, a cycloalkyl group, an alkoxyalkyl group, or an alkoxy group.

Examples of the alkyl group include a methyl group, an ethyl group, a propyl group, an isopropyl group, a tert-butyl group, a pentyl group, a hexyl group, an octyl group, a dodecyl group, a tridecyl group, a tetradecyl group, and a pentadecyl group, examples of the aryl group include a phenyl group, and a naphthyl group, examples of the cycloalkyl group include a cyclopentyl group, and a cyclohexyl group, examples of the alkoxyalkyl group include a β-methoxymethyl group, a γ-methoxy propyl group, examples of the alkoxy group include a methoxy group, an ethoxy group, a propyloxy group, a pentyloxy group, a hexyloxy group, an octyloxy group, and a dodecyloxy group.

Specific examples of the compounds represented by Formula (4) according to the present invention will now be listed, however the presented invention is not limited thereto.

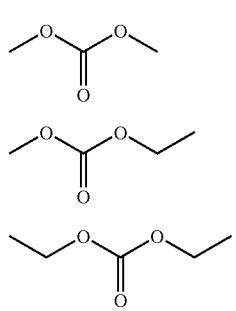

Of the compounds represented by above exemplified Formulas (3) and (4), specifically preferred are Exemplified Compounds (3-1), (3-2), and (4-3).

The compounds represented by Formulas (1) and (2), according to the present invention, belong to one type of electrolyte solvents. Another solvent may simultaneously be employed so that the purpose and effects of the present invention are not adversely affected in the display element of the present invention. Specifically listed are tetramethylurea, sulfolane, dimethylsulfoxide, 1,3-dimethyl-2-imidazolidindne, 2-(N-methyl)-2-pyrrolidinone, hexamethylphosphorictriamide, triamide, N-methylpropionamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxyethane, diethoxyfuran, tetrahydrofuran, ethylene glycol, diethylene glycol, triethylene glycol monobutyl ether, and water. It is preferable to include at least one type of solvent of a solidification point of at most −20° C. and a boiling point of at least 120° C. among these solvents.

Further listed as usable solvents in the present invention may be the compounds described in J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electrolytes Handbook", Vol. 1, Academic Press (1972).

The electrolyte solvent may be a single variety or a solvent mixture. However preferred is a solvent mixture containing ethylene carbonate in the present invention. The added amount of ethylene carbonate is preferably 10 to 90% by weight with respect to the total electrolyte solvent weight.

The specifically preferred electrolyte solvent is the solvent mixture of propylene carbonate/ethylene carbonate at a weight ratio of 7/3 to 3/7. When the ratio of propylene carbonate is more than 7/3, the response rate is lowered due to degradation of ionic conductivity, while when it is less than 3/7, electrolytes tend to deposit at low temperature.

(White Scattering Material)

It is preferable that this invention contains a white scattering material and it may be contained by forming a porous white scattering layer to further enhance display contrast and white reflectance.

The porous scattering layer, which is applicable to this invention, can be formed by coating and drying an aqueous mixture of aqueous polymers substantially insoluble in the electrolyte solvents and a white pigment.

White pigments applicable to this invention include, for example, titanium dioxide (anatase or rutile type), barium sulfate, calcium carbonate, aluminum oxide, zinc oxide, magnesium oxide and zinc hydroxide, magnesium hydroxide, magnesium phosphate, hydrogen magnesium phosphate, alkaline earth metal salt, talc, kaolin, zeolite, acid clay, glass; organic compounds such as polyethylene, polystyrene, acrylic resin, ionomer, ethylene-vinyl acetate copolymer resin, benzoguanamine resin, urea-formalin resin, melamine-formalin resin, polyamide resin. These are used singly or mixture, or in a particle state which has voids changing index of reflectance.

Titanium dioxide, zinc oxide, zinc hydroxide are preferably employed among the white particles mentioned above in this invention. Further, employed as titanium oxide may be titanium oxide which has been subjected to a surface treatment employing an inorganic oxide (such as $Al_2O_3$, AlO(OH), or $SiO_2$), or titanium oxide which has been subjected to a treatment employing an organic compound such as trimethylolethane, triethanolamine acetic acid salts, or trimethylcyclosilane, in addition to the above surface treatment.

It is preferable to employ titanium oxide or zinc oxide in view of preventing staining at high humidity and reflectance due to index of refraction among these white particles.

Listed as an aqueous polymer which is substantially insoluble in electrolyte solvent according to the present invention may be water-soluble polymer and polymer which dispersed in water based solvent.

A water-soluble compound applicable to the present invention includes a natural compound such as proteins, including gelatin or gelatin derivatives, cellulose derivatives, starch, gum Arabic, dextran, Pullulan, or carrageenan, as well as synthetic polymer compounds such as polyvinyl alcohol, polyvinyl pyrrolidone, or acrylamide polymers and derivatives thereof. Gelatin derivatives include acetylated gelatin and phthalated gelatin. Polyvinyl alcohol derivatives include terminal alkyl group-modified polyvinyl alcohol and terminal mercapto group-modified polyvinyl alcohol. Cellulose derivatives include hydroxyethyl cellulose, hydroxypropyl cellulose, and carboxymethyl cellulose. Further, employed may be compounds described in Research Disclosure and on pages 71-75 of JP-A S64-13546, and high water absorptive polymers such as homopolymers of vinyl monomers having —COOM or —$SO_3$M (M being a hydrogen atom or an alkaline metal) and copolymers of these vinyl monomer or copolymers of these vinyl monomers and other vinyl monomers (for example, sodium methacrylate, ammonium methacrylate, and potassium acrylate), described in U.S. Pat. No. 4,960,681 and JP-A S62-245260. Two or more these binders may be employed in combination.

Preferably employed may be gelatin and derivatives thereof, or polyvinyl alcohol and derivatives thereof in the present invention.

Listed as polymers dispersed in water based solvents may be latexes such as natural rubber latex, styrene butadiene rubber, butadiene rubber, nitrile rubber, chloroprene rubber, isoprene rubber; heat curable resins which are prepared by dispersing, in water based solvents, polyisocyanate based, epoxy based, acryl based, silicone based, polyurethane based, urea based, phenol based, formaldehyde based, epoxy-polyamide based, melamine based, or alkyd based resins; or vinyl based resins. Of these polymers, it is preferable to employ water based polyurethane resins described in JP-A H10-76621.

"Being substantially insoluble in electrolyte solvents", as described in the present invention, is defined as a state in which the dissolved amount per kg of the electrolyte solvents is 0 to 10 g in the temperature range of −20 to 120° C. It is possible to determine the above dissolved amount employing the methods known in the art, such as a weight measuring method, or a component quantitative method utilizing liquid chromatogram and gas chromatogram.

The aqueous mixture of water based compounds and white pigment is preferably that the white pigment is dispersed in water based by dispersion methods known in the art. The mixing ratio of water based compounds/white pigment is preferably in the range of 1 to 0.01 in terms of volume ratio, but is more preferably in the range of 0.3 to 0.05.

Media to coat the aqueous mixture of the water based compounds according to the present invention and white pigment may be located anywhere as long as they are located on the structural components between the counter electrodes of the display element. However, it is preferable that they are provided on at least one of the above counter electrodes. Examples of media providing methods include a coating system, a liquid spraying system, a spraying method via a gas phase, such as a system which jets liquid droplets employing vibration of a piezoelectric element such as a piezoelectric system ink-jet head, a BUBBLE JET (registered trade name) ink-jet head which ejects liquid droplets employing a thermal head utilizing bumping, and a spray system in which liquid is sprayed via air or liquid pressure.

An appropriate coating system may be selected from any of the coating systems known in the art, and examples thereof include an air doctor coater, a blade coater, a rod coater, a knife coater, a squeeze coater, an impregnation coater, a reverse roller coater, a transfer roller coater, a curtain coater, a double roller coater, a slide hopper coater, a gravure coater, a kiss roller coater, a bead coater, a spray coater, a calender coater, and an extrusion coater.

Methods to dry the aqueous mixture of water based compounds and titanium oxide provided on the medium according to the present invention are not particularly limited as long as they facilitate water evaporation. Examples thereof include heating employing a heating source, a heating method employing infrared radiation, and a heating method utilizing electromagnetic induction. Further, water evaporation may be performed under reduced pressure.

Porosity refers to the following state. After forming porous white scattering materials by applying the above aqueous mixture of the water based compounds and titanium oxide on the electrode(s) and subsequently drying the resulting coating, an electrolyte containing silver or compounds containing silver in their chemical structure is provided onto the resulting scattering material, followed by sandwiching employing the counter electrodes. The above state is such that when electric potential is applied between the resulting counter electrodes, it is possible to undergo silver dissolution and deposition reaction, and refers to a penetration state in which ion species are movable between the electrodes.

It is preferable that the water based compounds undergo a hardening reaction employing hardening agents during coating and drying of the above aqueous mixture or after drying of the same in the display element of the present invention.

Examples of hardening agents employed in the present invention include those described in the column 41 of U.S. Pat. Nos. 4,678,739, 4,791,042, as well as JP-A S59-116655, S62-245261, S61-18942, S61-249054, 561-245153, and H04-218044. Specific hardening agents include aldehyde based hardening agents such as formaldehyde, aziridine based hardening agents, epoxy based hardening agents, vinylsulfon based hardening agents such as N,N'-ethylenebis(vinylsulfonylacetamido)ethane, N-methylol based hardening agents such as dimethylolurea, boric acid, metaboric acid and polymer hardening agents such as a compound described in JP-A S62-234157. When gelatin is employed as a water based compound, of the above hardening agents, it is preferable to employ vinylsulfon type hardening agents and chlorotriazine type hardening agents, individually or in combinations. Further, when polyvinyl alcohol is employed, it is preferable to employ boron containing compounds such as boric acid or metaboric acid.

The employed amount of these hardening agents is commonly 0.001 to 1 g per g of the water based compounds, but is preferable 0.005 to 0.5 g. It is possible to employ a heat treatment and to regulate humidity during the hardening reaction in order to increase layer strength.

(Electron Insulating Layer)

Electron insulating layer may be provided in the display element of this invention.

The electron insulating layer may be a layer which has ion conductivity as well as electron insulation. Examples include a solid electrolyte film made of polymer or salt having polar group, a quasi-solid electrolyte film carrying electrolyte in voids of porous film with high electron insulation, polymer porous film having voids, and a porous inorganic material having low dielectric constant such as a silicon containing compound.

As a forming method of a porous film, there can be used any appropriate method known in the art such as a firing method (fusing method) (utilizing pores created among particles prepared by partially fusing polymer fine particles or inorganic particles via addition of a binder); an extraction method (in which a constituent layer is formed using an organic or inorganic substance soluble in a solvent and a binder insoluble in the solvent, followed by dissolving the organic or inorganic substance with the solvent to obtain fine pores); a foaming method of allowing a high molecular weight polymer to foam by heating or degassing; a phase conversion method of allowing a mixture of polymers to be phase-separated by use of a good solvent and a poor solvent; and a radiation exposure method of forming pores via exposure of various kinds of radiations. Specifically, there can be listed the electron insulating layers described in JP-A Nos. H10-30181, 2003-107626; Examined Japanese Patent Application Publication No. H7-95403; and Japanese Patent Nos. 2635715, 2849523, 2987474, 3066426, 3464513, 3483644, 3535942, and 3062203.

(Thickener Added to Electrolyte)

It is possible to employ a thickener in the display element of the present invention. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals), such as poly(vinyl formal and poly(vinyl butyral), poly(esters), poly(urethanes), phenoxy resins, poly(vinylidene chloride), poly(epoxides), poly(carbonates), poly(vinyl acetate), cellulose esters, poly(amides). Hydrophobic transparent binders include polyvinyl butyral, cellulose acetate, cellulose acetate butyrate, polyester, polycarbonate, polyacrylic acid, and polyurethane.

These thickeners may be employed in combinations of at least two types. Further listed may be the compounds described on pages 71-75 of JP-A S64-13546. In view of enhancement of compatibility with various additives and dispersion stability of white particles, of these, preferably employed compounds include polyvinyl alcohols, polyvinylpyrrolidones, hydroxypropyl celluloses, and polyalkylene glycols.

(Other Additives).

Constituting layers of the display element of the present invention may include subsidiary layers such as a protective layer, a filter layer, an antihalation layer, a cross-over light cutting layer, or a backing layer. If desired, may be incorporated in these subsidiary layers are various types of chemical sensitizers, noble metal sensitizers, sensitizing dyes, supersensitizing dyes, couplers, high-boiling point solvents, antifoggants, stabilizers, development restrainers, bleach accelerators, fixing accelerators, color mixing inhibitors, formalin scavengers, toning agents, hardeners, surface active agents, thickeners, plasticizers, lubricants, UV absorbers, anti-irradiation dyes, filter light absorbing dyes, fungicides, polymer latexes, heavy metals, antistatic agents, and matting agents.

These additives, described above, are detailed in Research Disclosure (hereinafter referred to as RD), Volume 176 Item/17643 (December 1978), Volume 184 Item/18431 (August 1979), Volume 187 Item/18716 (November 1979), and Volume 308. Item/308119 (December 1989).

Types and listed positions of the compounds cited in these three Research Disclosures are described below.

| Additive | RD 17643 Page & Class | RD 18716 Page & Class | RD 308119 Page & Class |
|---|---|---|---|
| Chemical Sensitizer | 23 III | 648 upper right | 96 III |
| Sensitizing Dye | 23 IV | 648-649 | 996-998 IV |
| Desensitizing Dye | 23 IV |  | 998 IV |
| Dye | 25-26 VIII | 649-650 | 1003 VIII |
| Development Accelerator | 29 XXI | 648 upper right |  |
| Antifoggant, Stabilizer | 24 IV | 649 upper right | 1006-1007 VI |
| Whitening Agent | 24 V |  | 998 V |
| Hardener | 26 X | 651 left | 1004-1005 X |
| Surface Active Agent | 26-27 XI | 650 right | 1005-1006 XI |
| Antistatic Agent | 27 XII | 650 right | 1006-1007 XIII |
| Plasticizer | 27 XII | 650 right | 1006 XII |
| Lubricant | 27 XII |  |  |
| Matting Agent | 28 XVI | 650 right | 1008-1009 XVI |
| Binder | 26 XXII |  | 1003-1004 IX |
| Support | 28 XVII |  | 1009 XVII |

(Substrates)

Preferably employed as substrates usable in the present invention may be synthetic plastic films composed, for example, of polyolefins such as polyethylene or polypropylene, polycarbonates, cellulose acetate, polyethylene terephthalate, polyethylenedinaphthalene dicarboxylate, polyethylene naphthalates, polyvinyl chloride, polyimide, polyvinyl acetals, or polystyrene. Further, preferred are syndiotactic-structured polystyrenes. It is possible to obtain these employing the methods described, for example, in JP-A S62-117708, JP-A H01-46912, and JP-A H01-178505. Further listed are metal substrates of stainless steel, paper supports such as baryta paper or resin-coated paper, supports composed of the above plastic film having thereon a reflection layer, and those described, as a support, in JP-A S62-253195 (pages 29-31). It is possible to preferably employ those described on page 28 of RD No. 17643, from the light column on page 647 to the left column on page 648 of RD No. 18716, and on page 879 of RD No. 307105. As described in U.S. Pat. No. 4,141,735, these supports may be subjected to a thermal treatment at a temperature below Tg so that core-set curl is minimized. Further, the surface of these supports may be subjected to a surface treatment for the purpose of enhancement of adhesion of the support to another constitution layer. In the present invention employed as a surface treatment may be a glow discharge treatment, an ultraviolet radiation treatment, a corona treatment, and a flame treatment. Further employed may be supports described on pages 44-149 of Kochi Gijutsu (Known Technology) No. 5 (published by AZTEC Japan., Mar. 22, 1991). Further listed are those described on page 1009 of RD No. 308119, as well as in the item "Supports" on page 108 of Product Licensing Index Volume 92. Other than the above, employed may be glass substrates and epoxy resins kneaded with glass powder.

(Electrode)

It is preferable that at least one of the counter electrodes is a metal electrode in the display element of the present invention. Employed as a metal electrode may be metals such as platinum, gold, silver, copper, aluminum, zinc, nickel, titanium, or bismuth, as well as alloys thereof, which are known in the art. Preferred metals employed in the metal electrodes are those which exhibit a work function near the oxidation-reduction potential of silver in the electrolyte. Of these, a silver electrode or an electrode composed of silver in an amount of at least 80% is advantageous to maintain reduced silver, and further, results in anti-staining of electrodes. Employed as a method to prepare the electrodes may be conventional ones such as an evaporation method, a printing method, an ink-jet printing method, a spin coating method, or a CVD method.

Further, it is preferable that in the display element of the present invention, at least one of the counter electrodes is transparent. Transparent electrodes are not particularly limited as long as they are transparent and electrically conductive. Examples thereof include indium tin oxide (ITO), indium zinc oxide (IZO), fluorine-doped tin oxide (FTO), indium oxide, zinc oxide, platinum, gold, silver, rhodium, copper, chromium, carbon, aluminum, silicon, amorphous silicon, and BSO (bismuth silicon oxide). In order to form electrodes, as described above, for example, an ITO layer may be subjected to mask evaporation on a substrate employing a sputtering method, or after forming an ITO layer on the entire surface, patterning may be performed employing photolithography. The surface resistance value is preferably at most 100Ω/□, but is more preferably at most 10Ω/□. The thickness of the transparent electrode is not particularly limited, but is commonly 0.1 to 20 μm.

(Other Constituting Components of Display Element)

Sealing agents, columnar materials, and spacer particles may be employed in the display element of the present invention, according to necessity.

Sealing agents are those which perform sealing so that leak to the exterior is minimized, and are called sealants. Employed as sealing agents may be heat curing, light curing, moisture curing, and anaerobic during type resins such as epoxy resins, urethane based resins, acryl based resins, vinyl acetate based resins, en-thiol based resins, silicone based resins, or modified polymer resins.

Columnar materials provide a strong self-supporting capability (strength) between substrates. For example, listed may be a cylindrical form, a square pole form, an elliptic from, and a trapezoidal form which are arranged at definite intervals in a specified pattern such as a lattice. Further employed may be stripe-shaped ones arranged at definite intervals. It is preferable that the columnar materials are not randomly arranged but arranged at an equal distance so that the interval gradually varies, or a predetermined pattern is repeated at a definite cycle so that the distance between substrates is nearly maintained and image display is not degraded. When the columnar materials are such that the ratio of the area occupied by the display region of a display element is 1-40%, sufficient strength as a display element for commercial viability is obtained.

Spacers may be provided between paired substrates in order to maintain a uniform gap between them. As such spacers, exemplified may be spheres composed of resins or inorganic oxides. Further suitably employed are adhesion spacers, the surface of which is coated with thermoplastic resins. Columnar materials only may be provided in order to maintain a uniform gap between the substrates. However, both spacers and columnar materials may be provided. Instead of the columnar materials, only spacers may be employed as space-maintaining members. The diameter of spacers, when a columnar material is formed, is at most its height, but is preferably equal to the above height. When no columnar material is formed, the diameter of spacers corresponds to the thickness of the cell gap.

(Display Element Driving Method)

A controlling method of a transparent state and a colored state of the display element of the present invention is preferably determined based on the redox potential of a compound represented by Formula (A) and the deposition overvoltage of the metal salt compound.

For example, when a display element has a compound represented by Formula (A) and a silver salt compound between the opposed electrodes, a colored state other than black is expressed on the oxidation side and a black state is expressed on the reduction side. As one example of a controlling method in this case, there is exemplified a method in which a voltage higher than the redox potential of a compound represented by Formula (A) is applied and then the compound represented by Formula (A) is oxidized to express a colored state other than black; a voltage somewhere between the redox potential of the compound represented by Formula (A) and the deposition overvoltage of a silver salt compound is applied and then the compound represented by Formula (1) is reduced to return to a white state; a voltage lower than the deposition overvoltage of the silver salt compound is applied and then silver is deposited on the electrode to express a black state; and a voltage somewhere between the oxidation potential of the deposited silver and the redox potential of the compound represented by Formula (A) is applied and then the deposited silver is dissolved for discoloration.

Driving operation of the display element of the present invention may be simple matrix driving or active matrix driving. Simple matrix driving, as described in the present invention, refers to the driving method in which electric current is sequentially applied to a circuit in which a positive electrode line containing a plurality of positive electrodes faces a negative electrode line containing a plurality of negative electrodes so that each line intersects in the perpendicular direction. By employing simple matrix driving, it is possible to simplify the circuit structure and the driving IC, resulting in advantages such as lower production cost. Active matrix driving refers to a system in which scanning lines, data lines, and current feeding lines are formed in a checkered pattern and driving is performed by TFT circuits arranged in each of the squares of the checkered pattern. Since it is possible to switch for each pixel, advantages result in gradation as well as memory function. For example, it is possible to employ the circuit described in FIG. 5 of JP-A 2004-29327.

(Applicable Products)

It is possible to apply the display element of the present invention to electronic book related fields, ID card related fields, public information related fields, transportation related fields, broadcasting related fields, account settling fields, and distribution and logistics related fields. Specific examples include door keys, student identification cards, employee ID cards, various club membership cards, convenience store cards, department store cards, vending machine cards, gas station cards, subway and railroad cards, bus cards, cash cards, credit cards, highway cards, driver licenses, hospital medical examination cards, health insurance cards, Basic Resident Registers, passports, and electronic books.

EXAMPLES

The present invention will now be described with reference to examples, however, the present invention is not limited thereto. In the following examples, "parts" or "W" mean "mass parts" and "mass %", respectively, unless otherwise specified.

Example 1

Preparation of Display Elements, Referring to FIG. 1
(Preparation of Display Element No. 1-1)
(Preparation of Electrolyte Liquid No. 1)

Added to 2.5 g of dimethyl sulfoxide (DMSO) were 0.1 g of bismuth chloride, 0.2 g of lithium bromide, and 0.025 g of tetrabutylammonium perchloride which were allowed to completely dissolve to obtain Electrolyte Liquid No. 1.

(Preparation of Electrode No. 1)

An ITO film, at a pitch of 145 µm and an electrode width of 130 µm, was formed on a 2 cm×4 cm glass substrate having a thickness of 1.5 mm via a conventional method, whereby a transparent electrode (Electrode No. 1) was prepared.

(Preparation of Electrode No. 2)

Phenothiazine in an amount of 900 mg and 100 mg of polyvinylidene fluoride (a binder) were mixed. To there 4 ml of N-methylpyrrolidone (NMP) was added and stirred to become slurry state. The obtained slurry state liquid was coated on the whole surface of the Electrode 1 via doctor blade, so as to have a dry thickness of 0.5 µm, and was dried at 80° C. for 3 minutes. Thus the Electrode No. 2 was obtained.

(Preparation of Electrode No. 3)

A nickel electrode, at a pitch of 145 µm, an electrode width of 130 µm and electrode thickness of 0.1 µm, was formed on a 2 cm×4 cm glass substrate having a thickness of 1.5 mm via a conventional method. The obtained electrode was immersed into substitution gold plating bath whereby a gold-nickel electrode substituted with gold up to depth of 0.05 µm (Electrode No. 3) was prepared.

(Preparation of Display Element)

The peripheral portion of Electrode 2 was hemmed by an olefin based sealing agent containing spherical glass beads of an average particle diameter of 40 µm at a volume ratio of 10%, and on the above, Electrode No. 3 was superposed so that electrode sides faced each other and each stripe electrodes were orthogonally arranged, followed by heating and pressing, whereby empty cells were prepared. Electrolyte Liquid 1 was injected through the above open section via a vacuum injection method and the open section was sealed with epoxy based ultraviolet ray-curable resins, whereby Display Element No. 1-1 was prepared.

(Preparation of Display Element No. 1-2)
(Preparation of Electrode No. 4)

Compound A-42 in an amount of 900 mg and 100 mg of polyvinylidene fluoride (a binder) were mixed. To there 4 ml of N-methylpyrrolidone (NMP) was added and stirred to become slurry state. The obtained slurry state liquid was coated on the whole surface of the Electrode 1 via doctor blade, so as to have a dry thickness of 0.5 µm, and was dried at 80° C. for 3 minutes. Thus the Electrode No. 4 was obtained.

(Preparation of Display Element)

Display Element No. 1-2 was prepared in the same way as Display Element No. 1-1 except that the Electrodes No. 4 was employed in place of Electrode No. 2.

(Preparation of Display Element No. 1-3)
(Preparation of Electrode No. 5)

Compound A-42 in an amount of 900 mg and 100 mg of polyvinylidene fluoride (a binder) were mixed. To there 4 ml of N-methylpyrrolidone (NMP) was added and stirred to become slurry state. The obtained slurry state liquid was coated on the surface of the Electrode 1 by adjusting condition of screen printing method with a mesh by which a ratio of region having the compound A-42 being immobilized and region having the compound A-42 being not immobilized was 9:1, so as to have a dry thickness of 0.5 µm, and was dried at 80° C. for 3 minutes. Thus the Electrode 5 was obtained.

It was confirmed by observation via an optical microscope that the ratio of region having the compound A-42 being immobilized and region having the compound A-42 being not immobilized was 9:1.

(Preparation of Display Element)

Display Element No. 1-3 was prepared in the same way as Display Element No. 1-1 except that the Electrode No. 5 was employed in place of Electrode No. 2.

(Preparation of Display Elements. Nos. 1-4 to 1-8)

Display Elements Nos. 1-4 to 1-8 were prepared in the same way as Display Element 1-1 except that a mesh and the printing condition were controlled so that the ratio of the region having the compound represented by Formula (A) being immobilized to the region having the compound being not immobilized was shown in Table 1.

(Preparation of Display Element)

Display Elements Nos. 1-4 to 1-8 were prepared in the same way as Display Element No. 1-1 except that the Electrodes Nos. 6 to 10 was employed in place of Electrode No. 2.

(Preparation of Display Elements Nos. 1-9 to 1-11)
(Preparation of Electrolyte Liquid No. 2)

Added to 2.5 g of Compound 3-4 were 0.1 g of silver p-toluenesulfonate, and 0.025 g of tetrafluoroborate spiro-(1, 1')-bipyrrolidinium which were allowed to dissolve to obtain Electrolyte Liquid No. 2.

(Preparation of Electrolyte Liquid No. 3)

Added to 2.5 g of Compound 3-4 were 0.1 g of silver p-toluenesulfonate, 0.2 g of compound 2-12, and 0.025 g of tetrafluoroborate spiro-(1,1')-bipyrrolidinium which were allowed to dissolve to obtain Electrolyte Liquid No. 3.

(Preparation of Electrolyte Liquid No. 4)

Added to 2.5 g of Compound 3-4 were 0.1 g of silver p-toluenesulfonate, 0.2 g of compound 1-3, and 0.025 g of tetrafluoroborate spiro-(1,1')-bipyrrolidinium which were allowed to dissolve to obtain Electrolyte Liquid No. 4.

Minolta Sensing, Inc.). The observed reflectance was made as an indicator for the reflectance during black display speed. The lower reflectance indicates higher display speed.

The results thus obtained are summarized in Table 1.

TABLE 1

| Display Element No. | Transparent Electrode | | | | Electrolyte Liquid | | | | Result Display speed | | Remarks |
|---|---|---|---|---|---|---|---|---|---|---|---|
| | No. | Shape | Immobilized Compound | Coverage (%) | No. | Metal Compound | Additive 1 | Solvent 1 | Color (%) | Black (%) | |
| 1-1 | 2 | Plane(FIG. 1) | Phenothiazine | 100 | 1 | Bismuth chloride | Lithium bromide | DMSO | 48 | 52 | Comp. |
| 1-2 | 4 | Plane(FIG. 1) | A-42 | 100 | 1 | Bismuth chloride | Lithium bromide | DMSO | 14 | 45 | Comp. |
| 1-3 | 5 | Plane(FIG. 1) | A-42 | 90 | 1 | Bismuth chloride | Lithium bromide | DMSO | 15 | 44 | Comp. |
| 1-4 | 6 | Plane(FIG. 1) | A-42 | 10 | 1 | Bismuth chloride | Lithium bromide | DMSO | 45 | 20 | Comp. |
| 1-5 | 7 | Plane(FIG. 1) | A-42 | 80 | 1 | Bismuth chloride | Lithium bromide | DMSO | 15 | 20 | Inv. |
| 1-6 | 8 | Plane(FIG. 1) | A-42 | 65 | 1 | Bismuth chloride | Lithium bromide | DMSO | 16 | 15 | Inv. |
| 1-7 | 9 | Plane(FIG. 1) | A-42 | 50 | 1 | Bismuth chloride | Lithium bromide | DMSO | 18 | 15 | Inv. |
| 1-8 | 10 | Plane(FIG. 1) | A-42 | 20 | 1 | Bismuth chloride | Lithium bromide | DMSO | 20 | 15 | Inv. |
| 1-9 | 8 | Plane(FIG. 1) | A-42 | 65 | 2 | Ag PTS | none | DMSO | 14 | 11 | Inv. |
| 1-10 | 8 | Plane(FIG. 1) | A-42 | 65 | 3 | Ag PTS | 2-12 | 3-4 | 10 | 7 | Inv. |
| 1-11 | 8 | Plane(FIG. 1) | A-42 | 65 | 4 | Ag PTS | 1-3 | 3-4 | 9 | 6 | Inv. |
| 1-12 | 11 | Plane(FIG. 1) | A-113 | 65 | 3 | Ag PTS | 2-12 | 3-4 | 9 | 6 | Inv. |
| 1-13 | 12 | Plane(FIG. 1) | A-115 | 65 | 3 | Ag PTS | 2-12 | 3-4 | 10 | 7 | Inv. |

DMSO: Dimethyl sulfoxide
Ag, PTS: silver p-toluenesulfonate
Comp.: Comparative,
Inv.: Inventive (Preparation of Display Element)

Display Elements Nos. 1-9 to 1-11 were prepared in the same way as Display Element No. 1-6 except that the Electrolyte Liquid Nos. 2 to 4 were employed, respectively, in place of Electrolyte Liquid No. 1.

(Preparation of Display Elements Nos. 1-12 to 1-13)
(Preparation of Electrode No. 11)

Electrode No. 11 was prepared in the same way as Electrode 8 except that the Compound A-113 was employed in place of Compound A-42.

(Preparation of Electrode No. 12)

Electrode 12 was prepared in the same way as Electrode 8 except that the Compound A-115 was employed in place of Compound A-42.

(Preparation of Display Element)

Display Elements Nos. 1-12 and 1-13 were prepared in the same way as Display Element No. 1-10 except that the Electrodes Nos. 11 and 12 were employed, respectively, in place of Electrode No. 8.

<<Evaluation of the Display Elements>>
(Color Display Speed)

The reflectance at maximum absorbing wave length of visible region when a voltage of 1.5 V to transparent electrode for 1 second was applied, was measured using spectrophotometer CM-3700d (produced by Konica Minolta Sensing, Inc.). The observed reflectance was made as an indicator for the reflectance during color display speed. The lower reflectance indicates higher display speed.

(Black Display Speed)

The reflectance at 550 nm when a voltage of 1.5 V to transparent electrode for 1 second was applied, was measured using spectrophotometer CM-3700d (produced by Konica As can clearly be seen from the results in Table 1, display elements satisfying the ratio of the ratio of the region on which the compound represented by Formula (A) is immobilized to the region on which the compound is not immobilized as specified by the present invention exhibited sufficient color displaying speed and black displaying speed.

Example 2

Figure 2:
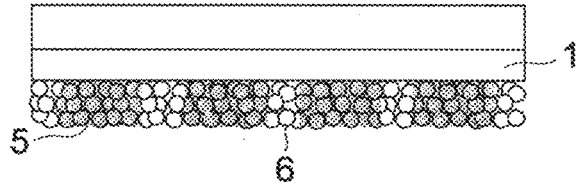
FIG. 2 is a schematic view showing a display element in which the compound represented by Formula (A) of this invention is immobilized having a pattern on the nano-porous electrode.
Figure 2:
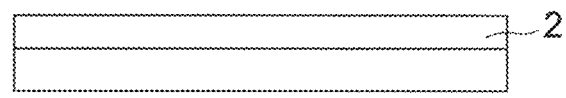
Figure 3:
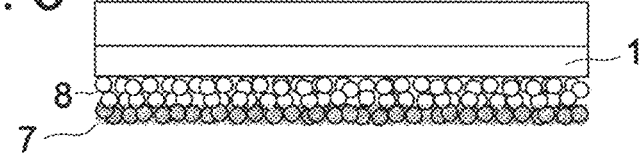
FIG. 3 is a schematic view showing a display element in which a layer in which the compound represented by Formula (A) of this invention is immobilized and a layer in which the compound represented by Formula (A) is not immobilized are superposed.
Figure 3:
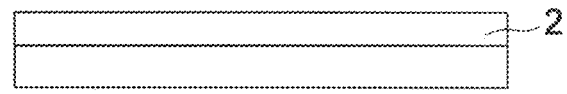

Preparation of Display Elements, Referring to FIG. 2
(Preparation of Display Element No. 2-1)
(Preparation of Electrode No. 13)

On the Electrode No. 1, a layer of titanium dioxide (necking processed with 4 to 10 particles having average particle diameter of 17 nm) with a dry thickness of 1 μm was formed. Ink 1 described below was jetted on the obtained electrode with an interval of 10 μm for 4 pl each via an inkjet device so as to form a checked pattern composed of covered and non-covered regions with phenothiazines to obtain Electrode No. 13.

It was confirmed by observation of Electrode No. 13 via an optical microscope that phenothizine was immobilized on the whole surface of the electrode.

(Preparation of Ink No. 1)

Ink No. 1 was prepared by dissolving phenothiazines in acetonitrile/ethanol so as to have 3 mmol/L.

(Preparation of Display Element)

The peripheral portion of Electrode No. 13 was hemmed by an olefin based sealing agent containing spherical glass beads of an average particle diameter of 40 μm at a volume ratio of 10%, and on the above, Electrode 3 was superposed so that electrode sides faced each other and each stripe electrodes were orthogonally arranged, followed by heating and pressing, whereby empty cells were prepared. Electrolyte Liquid 1 was injected through the above open section via a vacuum injection method and the open section was sealed with epoxy based ultraviolet ray-curable resins, whereby Display Element No. 2-1 was prepared.
(Preparation of Display Element No. 2-2)
(Preparation of Electrode No. 14)

Paste containing titanium dioxide having an average particle diameter of 10 nm was applied on Electrode No. 1 via screen printing method, and solvent was removed from the paste by heating at 150° C. for 30 minutes, whereby a nano-porous layer of titanium dioxide having a thickness of 1 μm was formed. Ink 2 described below was jetted on the obtained nano-porous layer with an interval of 10 μm for 4 pl each via an inkjet device so as to form a chessboard pattern composed of covered and non-covered regions with Compound A-42 to obtain Electrode No. 14.
(Preparation of Ink No. 2)

Ink No. 2 was prepared by dissolving Compound A-42 in acetonitrile/ethanol so as to have 3 mmol/L.
(Preparation of Display Element)

Display Element No. 2-2 was prepared in the same way as Display Element 2-1 except that Electrode No. 14 was employed in place of Electrode No. 13.
(Preparation of Display Elements Nos. 2-3 to 2-8)
(Preparation of Electrodes Nos. 15 to 20)

Electrodes Nos. 15 to 20 were prepared by controlling the inkjet printing condition so that the ratio of the region having the Compound A-42 being immobilized to the region having the compound being not immobilized satisfied the values shown in Table 2.

(Preparation of Display Elements)

Display Elements Nos. 2-3 to 2-8 were prepared in the same way as Display Elements No. 2-1 except that Electrodes Nos. 15 to 20 were employed, respectively, in place of Electrode No. 13.
(Preparation of Display Elements Nos. 2-9 to 2-11)
(Preparation of Display Elements)

Display Elements Nos. 2-9 to 2-11 were prepared in the same way as Display. Element No. 2-1 except that Electrolyte Liquid Nos. 2 to 4 were employed, respectively, in place of Electrolyte Liquid No. 1.
(Preparation of Display Elements Nos. 2-12 to 2-13)
(Preparation of Electrodes Nos. 21 and 22)

Electrodes Nos. 21 and 22 were prepared in the same way as Electrode No. 17 except that Inks Nos. 3 and 4 were employed, respectively, in place of Ink No. 2.
(Preparation of Ink No. 3)

Ink No. 3 was prepared by dissolving Compound A-113 in acetonitrile/ethanol so as to have 3 mmol/L.
(Preparation of Ink No. 4)

Ink No. 3 was prepared by dissolving'Compound A-115 in acetonitrile/ethanol so as to have 3 mmol/L.
(Preparation of Display Elements)

Display Elements Nos. 2-12 and 2-13 were prepared in the same way as Display Element Nos. 2-10 except that Electrodes Nos. 21 and 22 were employed, respectively, in place of Electrode No. 17.
<<Evaluation of the Display Elements>>

Color display speed and black display speed were measured in the same way as Example 1.

The result is summarized in Table 2.

TABLE 2

| Display Element No. | Transparent Electrode | | | | Electrolyte Liquid | | | Result Display speed | | Remarks |
|---|---|---|---|---|---|---|---|---|---|---|
| | No. | Shape | Immobilized Compound | Coverage (%) | No. | Metal Compound | Additive 1 | Solvent 1 | Color (%) | Black (%) | |
| 2-1 | 13 | Porous(FIG. 2) | Phenothiazine | 100 | 1 | Bismuth chloride | Lithium bromide | DMSO | 48 | 52 | Comp. |
| 2-2 | 14 | Porous(FIG. 2) | A-42 | 100 | 1 | Bismuth chloride | Lithium bromide | DMSO | 14 | 45 | Comp. |
| 2-3 | 15 | Porous(FIG. 2) | A-42 | 90 | 1 | Bismuth chloride | Lithium bromide | DMSO | 15 | 44 | Comp. |
| 2-4 | 16 | Porous(FIG. 2) | A-42 | 10 | 1 | Bismuth chloride | Lithium bromide | DMSO | 45 | 20 | Comp. |
| 2-5 | 17 | Porous(FIG. 2) | A-42 | 80 | 1 | Bismuth chloride | Lithium bromide | DMSO | 15 | 20 | Inv. |
| 2-6 | 18 | Porous(FIG. 2) | A-42 | 65 | 1 | Bismuth chloride | Lithium bromide | DMSO | 16 | 15 | Inv. |
| 2-7 | 19 | Porous(FIG. 2) | A-42 | 50 | 1 | Bismuth chloride | Lithium bromide | DMSO | 18 | 15 | Inv. |
| 2-8 | 20 | Porous(FIG. 2) | A-42 | 20 | 1 | Bismuth chloride | Lithium bromide | DMSO | 20 | 15 | Inv. |
| 2-9 | 17 | Porous(FIG. 2) | A-42 | 65 | 2 | Ag PTS | none | DMSO | 14 | 11 | Inv. |
| 2-10 | 17 | Porous(FIG. 2) | A-42 | 65 | 3 | Ag PTS | 2-12 | 3-4 | 10 | 7 | Inv. |
| 2-11 | 17 | Porous(FIG. 2) | A-42 | 65 | 4 | Ag PTS | 1-3 | 3-4 | 9 | 6 | Inv. |
| 2-12 | 21 | Porous(FIG. 2) | A-113 | 65 | 3 | Ag PTS | 2-12 | 3-4 | 9 | 6 | Inv. |
| 2-13 | 22 | Porous(FIG. 2) | A-115 | 65 | 3 | Ag PTS | 2-12 | 3-4 | 10 | 7 | Inv. |

DMSO: Dimethyl sulfoxide
Ag, PTS: silver p-toluenesulfonate
Comp.: Comparative,
Inv.: Inventive As can clearly be seen from the results in Table 2, display elements satisfying the ratio of the ratio of the region on which the compound represented by Formula (A) is immobilized to the region on which the compound is not immobilized as specified by the present invention exhibited sufficient color displaying speed and black displaying speed.

Example 3

Preparation of Display Elements, Referring to FIG. 4
(Preparation of Display Element No. 3-1)
(Preparation of Electrode No. 23)

Paste containing titanium dioxide having an average particle diameter of 10 nm was applied on Electrode No. 1 via screen printing method, and solvent was removed from the paste by heating at 150° C. for 30 minutes, whereby a nano-porous layer of titanium dioxide having a thickness of 0.9 μm was formed. The obtained electrode having nano-porous layer was soaked in Ink No. 2 over night, whereby the nano-porous layer as a whole was covered with Compound A-42.

Paste containing titanium dioxide having an average particle diameter of 10 nm was applied on the nano-porous layer having covered with Compound A-42 obtained above via screen printing method, and solvent was removed from the paste by heating at 150° C. for 30 minutes, whereby a nano-porous layer which was not covered with Compound A-42 having a thickness of 0.1 μm was formed. Thus Electrode 23 was prepared.

The ratio of a region on which Compound A-42 is immobilized to a region on which Compound A-42 is not immobilized is defined as a ratio of thickness of nano-porous layer covered with Compound A-42 to thickness of nano-porous layer not covered with Compound A-42.

(Preparation of Display Element)

The peripheral portion of Electrode No. 23 was hemmed by an olefin based sealing agent containing spherical glass beads of an average particle diameter of 40 μm at a volume ratio of 100, and on the above, Electrode 3 was superposed so that electrode sides faced each other and each stripe electrodes were orthogonally arranged, followed by heating and pressing, whereby empty cells were prepared. Electrolyte Liquid 1 was injected through the above open section via a vacuum injection method and the open section was sealed with epoxy based ultraviolet ray-curable resins, whereby Display Element 3-1 was prepared.

(Preparation of Display Elements Nos. 3-2 to 3-6)
(Preparation of Electrode No. 24)

Paste containing titanium dioxide having an average particle diameter of 10 nm was applied on Electrode No. 1 via screen printing method, and solvent was removed from the paste by heating at 150° C. for 30 minutes, whereby a nano-porous layer of titanium dioxide having a thickness of 0.1 was formed. The obtained electrode having nano-porous layer was soaked in Ink No. 2 over night, whereby the nano-porous layer as a whole was covered with Compound A-42.

Paste containing titanium dioxide having an average particle diameter of 10 nm was applied on the nano-porous layer having covered with Compound A-42 obtained above via screen printing method, and solvent was removed from the paste by heating at 150° C. for 30 minutes, whereby a nano-porous layer which was not covered with Compound A-42 having a thickness of 0.9 μm was formed. Thus Electrode No. 24 was prepared.

(Preparation of Electrode No. 25)

Paste containing titanium dioxide having an average particle diameter of 10 nm was applied on Electrode No. 1 via screen printing method, and solvent was removed from the paste by heating at 150° C. for 30 minutes, whereby a nano-porous layer of titanium dioxide having a thickness of 0.8 μm was formed. The obtained electrode having nano-porous layer was soaked in Ink No. 2 over one night, whereby the nano-porous layer as a whole was covered with Compound A-42.

Paste containing titanium dioxide having an average particle diameter of 10 nm was applied on the nano-porous layer having covered with Compound A-42 obtained above via screen printing method, and solvent was removed from the paste by heating at 150° C. for 30 minutes, whereby a nano-porous layer which was not covered with Compound A-42 having a thickness of 0.2 μm was formed. Thus Electrode No. 25 was prepared.

(Preparation of Electrode No. 26)

Paste containing titanium dioxide having an average particle diameter of 10 nm was applied on Electrode No. 1 via screen printing method, and solvent was removed from the paste by heating at 150° C. for 30 minutes, whereby a nano-porous layer of titanium dioxide having a thickness of 0.65 μm was formed. The obtained electrode having nano-porous layer was soaked in Ink No. 2 over night, whereby the nano-porous layer as a whole was covered with Compound A-42.

Paste containing titanium dioxide having an average particle diameter of 10 nm was applied on the nano-porous layer having covered with Compound A-42 obtained above via screen printing method, and solvent was removed from the paste by heating at 150° C. for 30 minutes, whereby a nano-porous layer which was not covered with Compound A-42 having a thickness of 0.35 μm was formed. Thus Electrode 26 was prepared.

(Preparation of Electrode No. 27)

Paste containing titanium dioxide having an average particle diameter of 10 nm was applied on Electrode 1 via screen printing method, and solvent was removed from the paste by heating at 150° C. for 30 minutes, whereby a nano-porous layer of titanium dioxide having a thickness of 0.5 μm was formed. The obtained electrode having nano-porous layer was soaked in Ink No. 2 over night, whereby the nano-porous layer as a whole was covered with Compound A-42.

Paste containing titanium dioxide having an average particle diameter of 10 nm was applied on the nano-porous layer having covered with Compound A-42 obtained above via screen printing method, and solvent was removed from the paste by heating at 150° C. for 30 minutes, whereby a nano-porous layer which was not covered with Compound A-42 having a thickness of 0.5 μm was formed. Thus Electrode No. 27 was prepared.

(Preparation of Electrode No. 28)

Paste containing titanium dioxide having an average particle diameter of 10 nm was applied on Electrode No. 1 via screen printing method, and solvent was removed from the paste by heating at 150° C. for 30 minutes, whereby a nano-porous layer of titanium dioxide having a thickness of 0.2 μm was formed. The obtained electrode having nano-porous layer was soaked in Ink No. 2 over night, whereby the nano-porous layer as a whole was covered with Compound A-42.

Paste containing titanium dioxide having an average particle diameter of 10 nm was applied on the nano-porous layer having covered with Compound A-42 obtained above via screen printing method, and solvent was removed from the paste by heating at 150° C. for 30 minutes, whereby a nano-porous layer which was not covered with Compound A-42 having a thickness of 0.8 μm was formed. Thus Electrode No. 28 was prepared.

(Preparation of Display Elements)

Display Elements Nos. 3-2 to 3-6 were prepared in the same way as Display Element No. 3-1 except that Electrodes Nos. 24 to 28 were employed, respectively, in place of Electrode No. 23.

(Preparation of Display Elements Nos. 3-7 to 3-11)

(Preparation of Display Elements)

Display Elements Nos. 3-2 to 3-6 were prepared in the same way as Display Element No. 3-1 except that Electrolytes Nos. 2 to 4 were employed, respectively, in place of Electrolyte No. 1.

(Preparation of Display Elements Nos. 3-10 and 3-11)

(Preparation of Electrodes Nos. 29 and 30)

Electrodes Nos. 29 and 30 were prepared in the same way as Electrode No. 25 except that Inks Nos. 3 and 4 were employed, respectively, in place of Ink No. 2.

(Preparation of Display Elements)

Display Elements Nos. 3-10 and 3-11 were prepared in the same way as Display Element No. 2-10 except that Electrodes Nos. 29 and 30 were employed, respectively, in place of Electrode No. 25.

<<Evaluation of the Display Elements>>

Color display speed and black display speed were measured in the same way as Example 1.

The result is summarized in Table 3.

a ratio of a region on which the compound represented by Formula (A) is immobilized to a region on which the compound is not immobilized is 1:4 to 4:1, the electrolyte comprises a metal salt compound, and a black display, a white display and a color display having a color other than black are achieved by operating the counter electrodes,

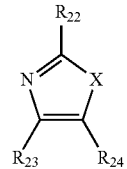

Formula (A)

in Formula (A), $R_{22}$ represents a substituted or unsubstituted aryl group;

$R_{23}$ and $R_{24}$ independently represents a hydrogen atom or a substituent; X represents $N-R_{25}$, an oxygen atom or sulfur atom; and $R_{25}$ represents a hydrogen atom or a substituent.

TABLE 3

| Display Element No. | Transparent Electrode | | | | Electrolyte Liquid | | | Result Display speed | | Remarks |
|---|---|---|---|---|---|---|---|---|---|---|
| | No. | Shape | Immobilized Compound | Coverage (%) | No. | Metal Compound | Additive 1 | Solvent 1 | Color (%) | Black (%) | |
| 3-1 | 13 | Porous(FIG. 2) | Phenothiazine | 100 | 1 | Bismuth chloride | Lithium bromide | DMSO | 39 | 51 | Comp. |
| 3-2 | 14 | Porous(FIG. 2) | A-42 | 100 | 1 | Bismuth chloride | Lithium bromide | DMSO | 9 | 40 | Comp. |
| 3-3 | 23 | Porous(FIG. 4) | A-42 | 90 | 1 | Bismuth chloride | Lithium bromide | DMSO | 11 | 39 | Comp. |
| 3-4 | 24 | Porous(FIG. 4) | A-42 | 10 | 1 | Bismuth chloride | Lithium bromide | DMSO | 36 | 18 | Comp. |
| 3-5 | 25 | Porous(FIG. 4) | A-42 | 80 | 1 | Bismuth chloride | Lithium bromide | DMSO | 7 | 12 | Inv. |
| 3-6 | 26 | Porous(FIG. 4) | A-42 | 65 | 1 | Bismuth chloride | Lithium bromide | DMSO | 6 | 10 | Inv. |
| 3-7 | 27 | Porous(FIG. 4) | A-42 | 50 | 1 | Bismuth chloride | Lithium bromide | DMSO | 10 | 8 | Inv. |
| 3-8 | 28 | Porous(FIG. 4) | A-42 | 20 | 1 | Bismuth chloride | Lithium bromide | DMSO | 14 | 10 | Inv. |
| 3-9 | 25 | Porous(FIG. 4) | A-42 | 65 | 2 | Ag PTS | none | DMSO | 5 | 6 | Inv. |
| 3-10 | 25 | Porous(FIG. 4) | A-42 | 65 | 3 | Ag PTS | 2-12 | 3-4 | 5 | 3 | Inv. |
| 3-11 | 25 | Porous(FIG. 4) | A-42 | 65 | 4 | Ag PTS | 1-3 | 3-4 | 4 | 3 | Inv. |
| 3-12 | 29 | Porous(FIG. 4) | A-113 | 65 | 3 | Ag PTS | 2-12 | 3-4 | 4 | 3 | Inv. |
| 3-13 | 30 | Porous(FIG. 4) | A-115 | 65 | 3 | Ag PTS | 2-12 | 3-4 | 5 | 4 | Inv. |

DMSO: Dimethyl sulfoxide
Ag, PTS: silver p-toluenesulfonate
Comp.: Comparative,
Inv.: Inventive As can clearly be seen from the results in Table 3, display elements satisfying the ratio of the ratio of the region on which the compound represented by Formula (A) is immobilized to the region on which the compound is not immobilized as specified by the present invention exhibited sufficient color displaying speed and black displaying speed.

The invention claimed is:

1. A display element comprising:
    an electrolyte between counter electrodes,
    a compound represented by Formula (A) is immobilized on at least one of the counter electrodes, 2. The display element as described in claim 1, wherein the electrode on which the compound represented by Formula (A) is immobilized is nano-porous electrode.

3. The display element as described in claim 1, wherein the compound represented by Formula (A) has an absorbing group which absorbs chemically or physically to an electrode surface.

4. The display element as described in claim 3, wherein the absorbing group is —COOH, —P=O(OH)$_2$, —OP=O(OH)$_2$ or —Si(OR)$_3$, wherein R is an alkyl group.

5. The display element as described in claim 1, wherein a region in which the compound represented by Formula (A) is immobilized and a region in which the compound represented by Formula (A) is not immobilized are formed by coating separately via an inkjet method.

6. The display element as described in claim 1, wherein a layer in which the compound represented by Formula (A) is immobilized and a layer in which the compound represented by Formula (A) is not immobilized are superposed.

7. The display element as described in claim 1, wherein the metal salt compound is a silver salt compound.

8. The display element as described in claim 1, wherein the electrolyte contains at least one of compounds represented by following Formula (1) or (2),

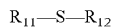  Formula (1)

in the formula, each of $R_{11}$ and $R_{12}$ represents a substituted or unsubstituted hydrocarbon group; when a ring containing an S atom is formed, an aromatic group is not included,

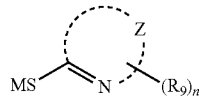  Formula (2)

in the formula, M represents a hydrogen atom, a metal atom, or quaternary ammonium; Z represents a nitrogen-containing heterocyclic ring; n represents an integer of 0 to 5; $R_9$ represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group, or a heterocyclic group, when n is at least 2, each $R_9$ may be the same or different and may be joined to form a condensed ring.

9. The display element, described in claim 1, wherein the electrolyte contains at least one of the compounds represented by following Formula (3) or (4),

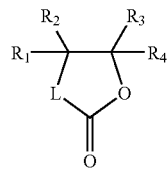  Formula (3)

in the formula, L represents an oxygen atom or $CH_2$, and each of $R_1$ through $R_4$ represents a hydrogen atom, an alkyl group, an alkenyl group, an aryl group, a cycloalkyl group, an alkoxyalkyl group, or an alkoxy group,

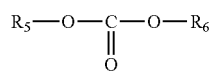  Formula (4)

in the formula, each of $R_5$ and $R_6$ represents a hydrogen atom, an alkyl group, an alkenyl group, an aryl group, a cycloalkyl group, an alkoxyalkyl group, or an alkoxy group.

* * * * *